(12) United States Patent
Murata

(10) Patent No.: US 9,654,150 B2
(45) Date of Patent: May 16, 2017

(54) MODULE WITH DUPLEXERS COUPLED TO DIPLEXER

(71) Applicant: TAIYO YUDEN CO., LTD., Tokyo (JP)

(72) Inventor: Ryuji Murata, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 27 days.

(21) Appl. No.: 14/735,804

(22) Filed: Jun. 10, 2015

(65) Prior Publication Data

US 2016/0006408 A1 Jan. 7, 2016

(30) Foreign Application Priority Data

Jul. 3, 2014 (JP) .................................. 2014-137560

(51) Int. Cl.
*H01Q 1/50* (2006.01)
*H04B 1/00* (2006.01)

(52) U.S. Cl.
CPC ................................. *H04B 1/0057* (2013.01)

(58) Field of Classification Search
CPC ........... H04B 1/0057; H04B 1/18; H04B 1/52
USPC .......................... 343/852, 702, 858, 895, 745
See application file for complete search history.

(56) References Cited

U.S. PATENT DOCUMENTS

| 7,049,906 B2* | 5/2006 | Wilcox | H04B 1/005 333/101 |
|---|---|---|---|
| 2005/0219010 A1* | 10/2005 | Erb | H04B 1/0458 333/126 |
| 2008/0119153 A1* | 5/2008 | Sugiyama | H03F 1/22 455/245.1 |
| 2010/0135193 A1* | 6/2010 | Przadka | H04B 1/406 370/297 |
| 2014/0203887 A1* | 7/2014 | Murata | H03H 7/38 333/103 |

FOREIGN PATENT DOCUMENTS

JP 2004-40322 A 2/2004

\* cited by examiner

*Primary Examiner* — Peguy Jean Pierre
(74) *Attorney, Agent, or Firm* — Chen Yoshimura LLP

(57) ABSTRACT

A module includes: a first duplexer including a common terminal coupled to a first terminal of a diplexer, the diplexer including an antenna terminal coupled to an antenna, the first terminal, and a second terminal; and a second duplexer including a common terminal coupled to the second terminal of the diplexer and having a passband different from a passband of the first duplexer, wherein a frequency at which a reactance component of an impedance is approximately zero and the impedance is less than a reference impedance is not located in a passband of the first duplexer, the impedance being an impedance when the second duplexer is viewed from a node at which the antenna terminal is divided into the first terminal and the second terminal in the diplexer.

15 Claims, 21 Drawing Sheets

FREQUENCY 760~960 MHz

FREQUENCY 760~960 MHz

MODULE WITH DUPLEXERS COUPLED TO DIPLEXER

CROSS-REFERENCE TO RELATED APPLICATION

This application is based upon and claims the benefit of priority of the prior Japanese Patent Application No. 2014-137560, filed on Jul. 3, 2014, the entire contents of which are incorporated herein by reference.

FIELD

A certain aspect of the present invention relates to a module.

BACKGROUND

Communication devices such as mobile phones have extended their capabilities to offer the connection to the Internet. To handle increasing communication data, technologies such as Long Term Evolution (LTE)-Advanced have been developed. LTE-Advanced employs Carrier Aggregation (CA) technology to enhance throughput. For example, Inter Band Non Contiguous CA simultaneously uses LTE bands of, for example, 800 MHz and 2 GHz to achieve a wider band, higher speed, and a greater amount of data in communications. Simultaneous transmission or simultaneous reception of two signals may be performed alone.

For smaller mobile phones, a common antenna transmits and/or receives signals in frequency bands of multiple communication systems. Japanese Patent Application Publication No. 2004-40322 discloses a technique that uses a diplexer coupled to an antenna to transmit and/or receive signals in different frequency bands via a single antenna.

When a diplexer is used to simultaneously transmit and/or receive signals in different frequency bands via a single antenna, multiple transmit/receive systems are simultaneously coupled to the diplexer. At this time, a notch is formed in a diplexer in the frequency band of a communication system.

SUMMARY OF THE INVENTION

According to an aspect of the present invention, there is provided a module including: a first duplexer including a common terminal coupled to a first terminal of a diplexer, the diplexer including an antenna terminal coupled to an antenna, the first terminal, and a second terminal; and a second duplexer including a common terminal coupled to the second terminal of the diplexer and having a passband different from a passband of the first duplexer, wherein a frequency at which a reactance component of an impedance is approximately zero and the impedance is less than a reference impedance is not located in a passband of the first duplexer, the impedance being an impedance when the second duplexer is viewed from a node at which the antenna terminal is divided into the first terminal and the second terminal in the diplexer.

According to another aspect of the present invention, there is provided a module including: a first duplexer including a common terminal coupled to a first terminal of a diplexer, the diplexer including an antenna terminal coupled to an antenna, the first terminal, and a second terminal; and a second duplexer including a common terminal coupled to the second terminal of the diplexer and having a passband different from a passband of the first duplexer, wherein a frequency at which a reflection coefficient has a minimum value is not located in the passband of the first duplexer, the reflection coefficient being a reflection coefficient when the second duplexer is viewed from a node at which the antenna terminal is divided into the first terminal and the second terminal in the diplexer.

DETAILED DESCRIPTION

A description will be given of embodiments with reference to drawings.

First Embodiment

Figure 1:
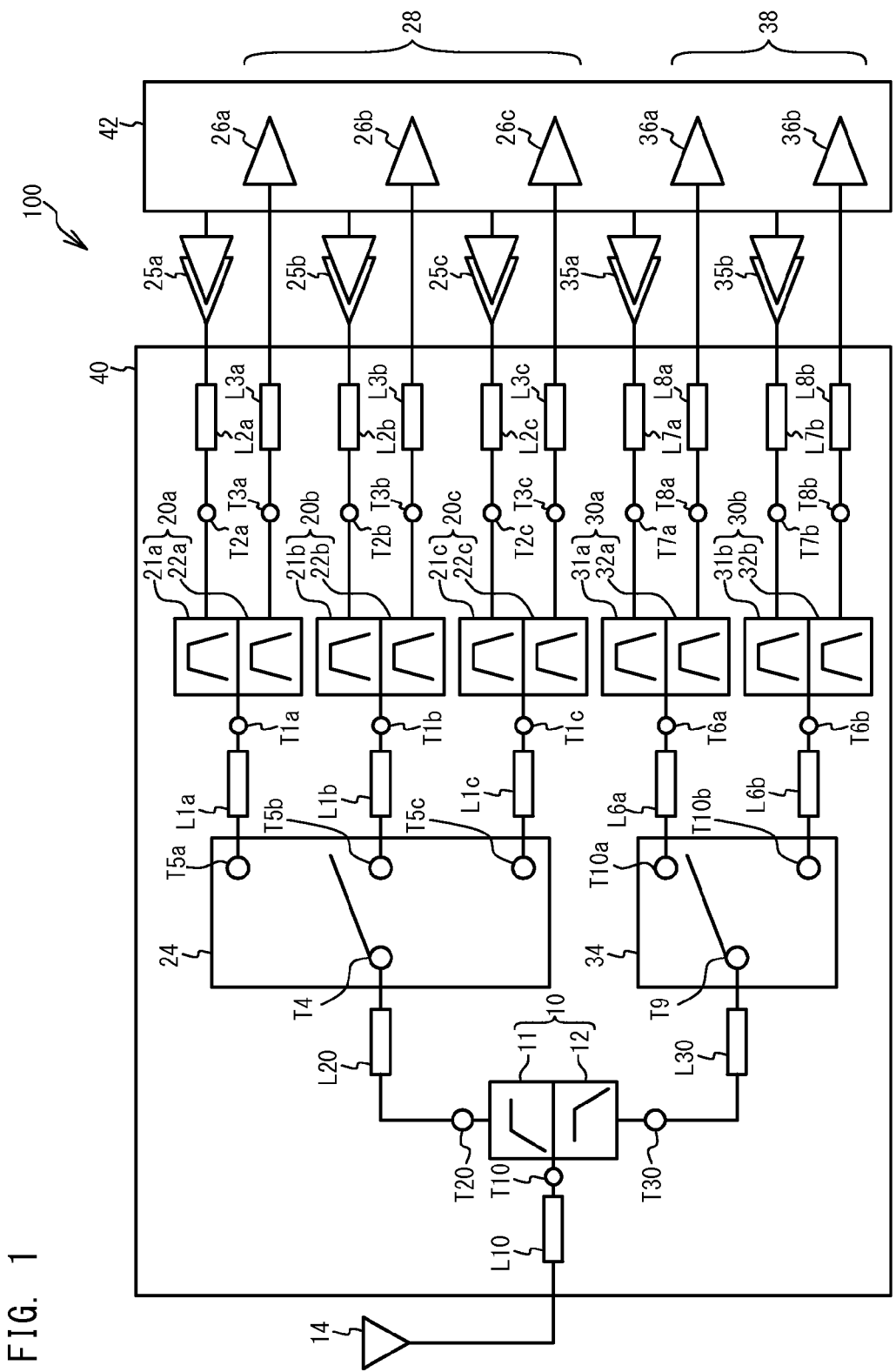
FIG. 1 is a block diagram illustrating a system including a module in accordance with a first embodiment.

FIG. 1 is a block diagram illustrating a system including a module in accordance with a first embodiment. A system 100 includes a module 40, an integrated circuit 42, an antenna 14, power amplifiers 25a through 25c, 35a, and 35b. On the module 40, mounted are a diplexer 10, high frequency switches 24 and 34, duplexers 20a through 20c, 30a, and 30b. Lines L10 through L30 and L1a through L8b are formed in the module 40. The lines L10 through L30 and L1a through L8b are formed to electrically connect elements. The lines L10 through L30, L1a through L3c, and L6a through L8b are formed in and on a dielectric substrate. These lines have a characteristic impedance of a reference impedance (e.g., 50Ω). The integrated circuit 42 includes low noise amplifiers 26a through 26c, 36a, and 36b.

The switch 24, the duplexers 20a through 20c, the power amplifiers 25a through 25c, and the low noise amplifiers 26a through 26c form a High Band (HB) transmit/receive system 28. The switch 34, the duplexers 30a and 30b, the power amplifiers 35a and 35b, and the low noise amplifiers 36a and 36b form a Low Band (LB) transmit/receive system 38.

The HB transmit/receive system 28 transmits and/or receives signals in a frequency band of a single communication system or in frequency bands of multiple communication systems. The duplexers 20a through 20c support corresponding communication systems. The communication system of the HB transmit/receive system 28 is at least one of Band 1 (transmit band: 1920 to 1980 MHz, receive band: 2110 to 2170 MHz), Band 2 (transmit band: 1850 to 1910 MHz, receive band: 1930 to 1990 MHz), Band 4 (transmit band: 1710 to 1755 MHz, receive band: 2110 to 2155 MHz), and Band 9 (transmit band: 1750 to 1785 MHz, receive band: 1845 to 1880 MHz). The communication system of the LB transmit/receive system 38 is at least one of Band 5 (transmit band: 824 to 849 MHz, receive band: 869 to 894 MHz), Band 6 (transmit band: 830 to 840 MHz, receive band: 875 to 885 MHz), and Band 8 (transmit band: 880 to 915 MHz, receive band: 925 to 960 MHz).

The duplexer 20a includes a transmit filter 21a and a receive filter 22a, the duplexer 20b includes a transmit filter 21b and a receive filter 22b, and the duplexer 20c includes a transmit filter 21c and a receive filter 22c. The transmit filter 21a is connected between a common terminal T1a and a transmit terminal T2a, the transmit filter 21b is connected between a common terminal T1b and a transmit terminal T2b, and the transmit filter 21c is connected between a common terminal T1c and a transmit terminal T2c. The receive filter 22a is connected between the common terminal T1a and a receive terminal T3a, the receive filter 22b is connected between the common terminal T1b and a receive terminal T3b, and the receive filter 22c is connected between the common terminal T1c and a receive terminal T3c.

The power amplifiers 25a through 25c amplify transmission signals supplied from the integrated circuit 42. The transmit filters 21a through 21c pass signals in the transmit band out of transmission signals, which are amplified by the power amplifiers 25a through 25c, to the common terminals T1a through T1c, and suppress signals outside the transmit band. The receive filters 22a through 22c pass signals in the receive band out of reception signals, which are supplied to the common terminals T1a through T1c, to the receive terminals T3a through T3c, and suppress signals outside the receive band. The low noise amplifiers 26a through 26c amplify signals supplied from the receive filters 22a through 22c. The switch 24 connects a terminal T4 to one of terminals T5a through T5c. When one of the duplexers 20a through 20c is provided, the switch 24 may not be provided, and a terminal T20 may be connected to a common terminal of the duplexers 20a through 20c.

The LB transmit/receive system 38 transmits and/or receives signals in a frequency band of a single communication system or in frequency bands of multiple communication systems. The duplexers 30a and 30b support corresponding communication systems.

The duplexer 30a includes a transmit filter 31a and a receive filter 32a, and the duplexer 30b includes a transmit filter 31b and a receive filter 32b. The LB transmit/receive system 38 has the same configuration as the HB transmit/receive system 28 except the above described configuration, and thus a description is omitted.

In the following description, each of the duplexers 20a through 20c, 30a, and 30b includes a transmit filter and a receive filter. However, the duplexer may include a transmit filter and a transmit filter, or a receive filter and a receive filter.

The diplexer 10 includes a High Pass Filter (HPF) 11 and a Low Pass Filter (LPF) 12. The HPF 11 is connected between an antenna terminal T10 and the terminal T20. The LPF 12 is connected between the antenna terminal T10 and a terminal T30.

The HPF 11 passes an HB signal in the frequency band of the communication system transmitted and/or received by the HB transmit/receive system 28 and suppresses an LB signal in the frequency band of the communication system transmitted and/or received by the LB transmit/receive system 38. The LPF 12 passes LB signals and suppresses HB signals. In the frequency band employed for mobile phones, the frequency band with frequencies less than or equal to 1 GHz corresponds to an LB band, and the frequency band with frequencies between 1.7 GHz and 2.7 GHz corresponds to an HB band.

The switch 24 selects one terminal from the terminals T5a through T5c to allow the HB transmit/receive system 28 to simultaneously transmit or receive signals in one frequency band. The switch 34 selects one terminal from terminals T10a and T10b to allow the LB transmit/receive system 38 to simultaneously transmit and/or receive signals in one frequency band. The diplexer 10 can simultaneously pass an HB signal transmitted and/or received by the HB transmit/receive system 28 and an LB signal transmitted and/or received by the LB transmit/receive system 38.

This enables to simultaneously transmit and/or receive an HB signal in the passband of the duplexer selected from the duplexers 20a through 20c by the switch 24 and an LB signal in the passband of the duplexer selected from the duplexers 30a and 30b by the switch 34 via the single antenna 14. As described above, a mode simultaneously transmitting and/or receiving an HB signal and an LB signal is called a CA-on mode. During the CA-on mode, a signal transmitted through one of the duplexers 20a through 20c and a signal transmitted through one of the duplexers 30a and 30b are simultaneously transmitted through the diplexer 10.

On the other hand, a mode transmitting and/or receiving only one of an HB signal and an LB signal is called a CA-off mode. During the CA-off mode, one of the switches 24 and 34 is off. Furthermore, a mode transmitting and/or receiving none of an HB signal and an LB signal is called an off mode.

When the HB transmit/receive system 28 and the LB transmit/receive system 38 are designed to match impedance during the CA-off mode, the HB transmit/receive system 28 affects the LB transmit/receive system 38 and the LB transmit/receive system 38 affects the HB transmit/receive system 28 through the diplexer 10 during the CA-on mode. For example, the HB transmit/receive system 28 affects pass characteristics of the LPF 12. The LB transmit/receive system 38 affects pass characteristics of the HPF 11. This may form a notch in the passband of the diplexer 10.

Figure 2:
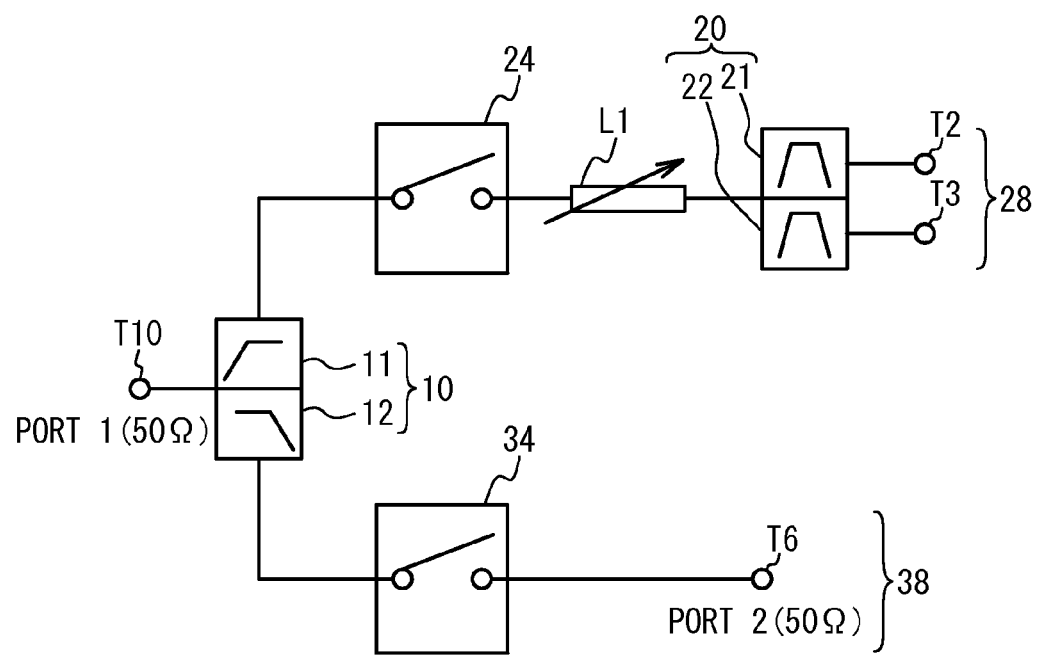
FIG. 2 is a circuit diagram of a circuit used to simulate pass characteristics of a Low Pass Filter (LPF) with a Low Band (LB) transmit/receive system when conditions of a High Band (HB) receive system coupled to a diplexer are changed.

An explanation will be given about that the HB transmit/receive system 28 affects pass characteristics of the LPF 12. FIG. 2 is a circuit diagram of a circuit used to simulate pass characteristics of the LPF with the LB transmit/receive system when conditions of the HB transmit/receive system coupled to the diplexer are changed. As illustrated in FIG. 2, the HB transmit/receive system 28 includes the switch 24 and a single duplexer 20. The duplexer 20 includes a transmit filter 21 and a receive filter 22. The duplexer 20 is a duplexer for Band 4. A line L1 is connected between the common terminal of the duplexer 20 and the switch 24. The LB transmit/receive system 38 includes the switch 34, but does not include the duplexer 30. The antenna terminal T10 corresponds to a port 1, and a terminal T6 corresponds to a port 2. The antenna terminal T10 and the terminal T6 are terminated in a reference impedance of 50 Ω.

The circuit illustrated in FIG. 2 was used to simulate pass characteristics S21 of the LPF 12 from the antenna terminal T10 to the terminal T6. In the simulation, the switches 24 and 34 are closed. The electrical length of the line L1 is changed to correspond to phases of 0°, 120°, 240°, and 360° of a Band 4 signal.

Figure 3A:
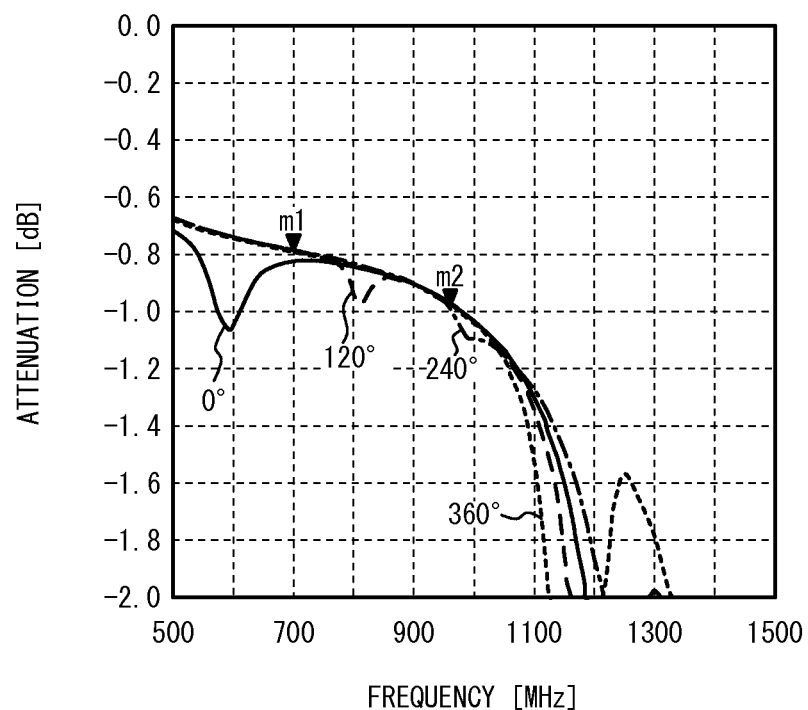
FIG. 3A and FIG. 3B are diagrams illustrating simulated pass characteristics S21 of the LPF with the LB transmit/receive system.
Figure 3B:
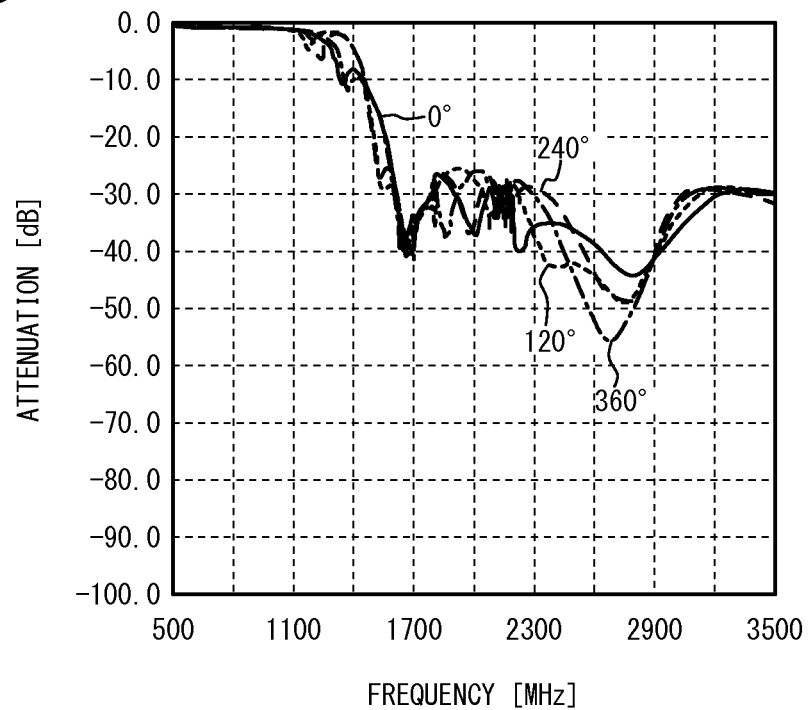

FIG. 3A and FIG. 3B are diagrams illustrating simulated pass characteristics S21 of the LPF with the LB transmit/receive system. FIG. 3A is an enlarged view of the pass characteristics S21 near the passband of the LPF 12, and FIG. 3B is a diagram of the pass characteristics S21 in the suppression band of the LPF 12 (near the passband of the HPF 11). A band between markers m1 and m2 is a typical LB band. As illustrated in FIG. 3A, the position of a notch changes according to the change of the electrical length of the line L1. A notch is formed in the LB band of the LPF 12 when the line L1 has a certain electrical length. As illustrated in FIG. 3B, a notch is also formed in the suppression band of the LPF 12 when the line L1 has a certain electrical length.

As described above, during the CA-on mode, the HB transmit/receive system 28 affects pass characteristics of the LPF 12. Especially, when a notch is formed in the passband, the diplexer 10 has a large insertion loss. Thus, the inventors investigated the reason why a notch was formed in the passband.

Figure 4A:
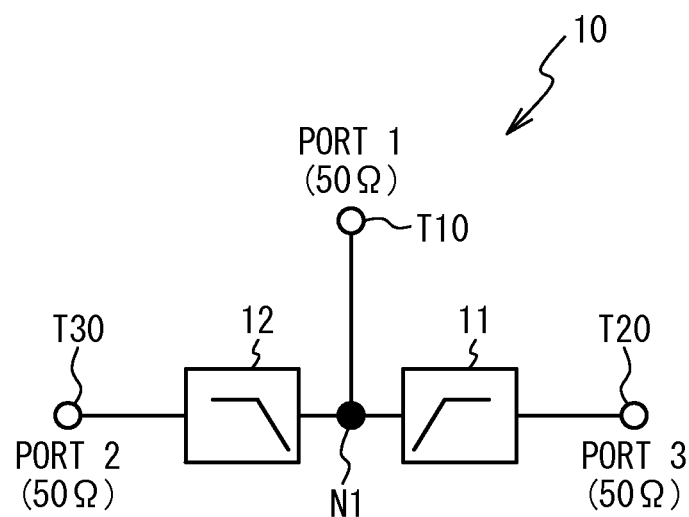
FIG. 4A is a circuit diagram of a diplexer used for simulation.
Figure 4B:
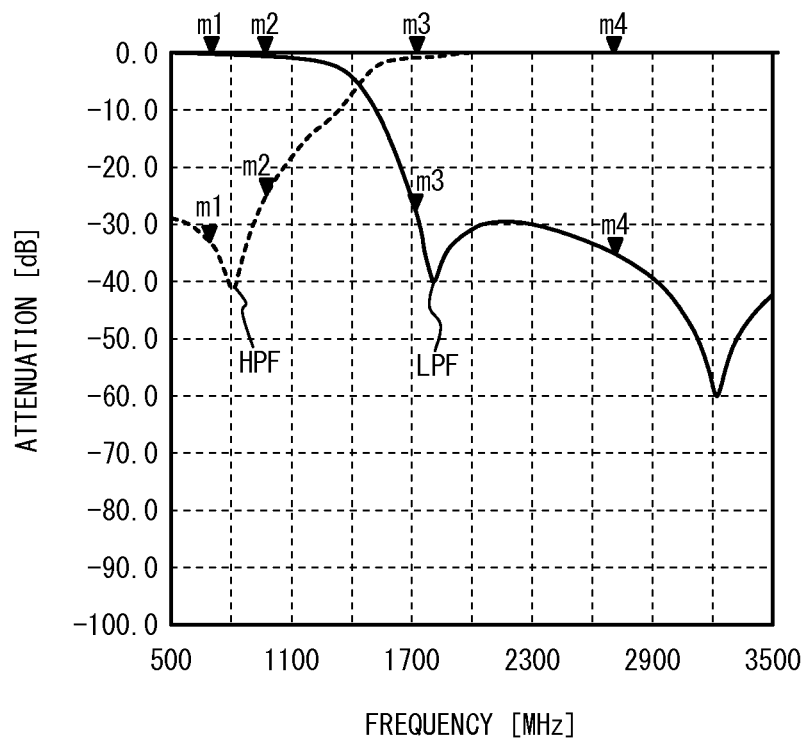
FIG. 4B is a diagram illustrating pass characteristics S21 and S31 of the diplexer.
Figure 5A:
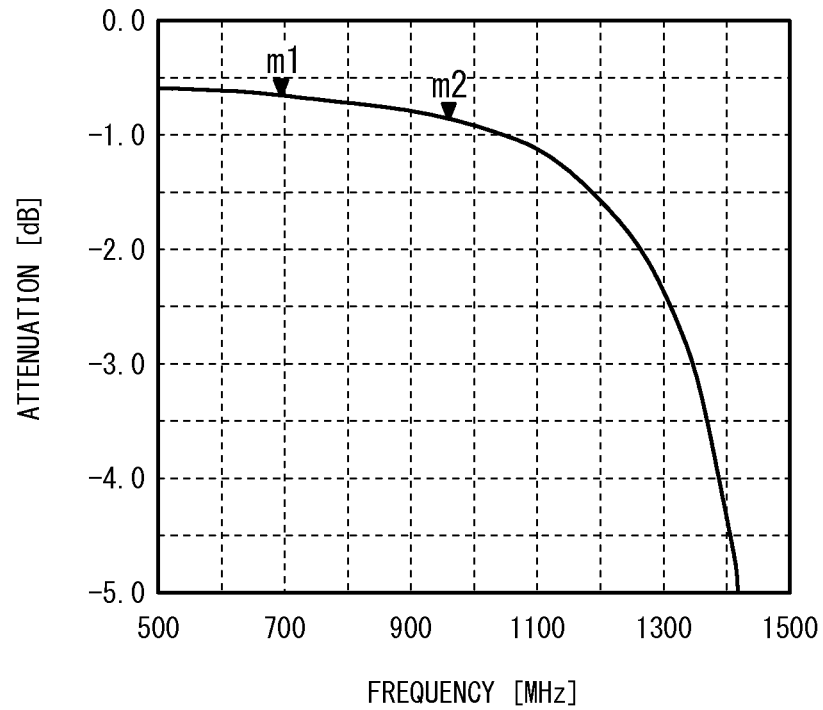
FIG. 5A is a diagram illustrating pass characteristics S21 near the passband of the LPF with the LB transmit/receive system.

A description will be given of pass characteristics of a diplexer 1 to which none of the HB transmit/receive system 28 and the LB transmit/receive system 38 is connected. FIG. 4A is a circuit diagram of a simulated diplexer, and FIG. 4B is a diagram illustrating pass characteristics S21 and S31 of the diplexer. FIG. 5A is a diagram illustrating the pass characteristics S21 near the passband of the LPF with the LB transmit/receive system, and FIG. 5B is a diagram illustrating the pass characteristics S31 near the passband of the HPF with the HB transmit/receive system.

As illustrated in FIG. 4A, the HPF 11 is connected between the antenna terminal T10 and the terminal T20, and the LPF 12 is connected between the antenna terminal T10 and the terminal T30. The antenna terminal T10 and the terminals T30 and T20 correspond to ports 1 through 3, respectively. The antenna terminal T10 and the terminals T20 and T30 are terminated in a reference impedance of 50Ω. At a node N1, the antenna terminal T10 is divided into the HPF 11 coupled to the terminal T20 and the LPF 12 coupled to the terminal T30. A node at which the antenna terminal T10 is divided into the terminal T20 and the terminal T30 will be described as the node N1.

Pass characteristics and reflection characteristics of the LPF with the LB transmit/receive system are pass characteristics and reflection characteristics when the LPF 12 is viewed from the node N1, and are mainly characteristics of the LPF 12. Thus, they may be simply described as pass characteristics or reflection characteristics of the LPF 12. Pass characteristics and reflection characteristics of the HPF with the HB transmit/receive system are pass characteristics and reflection characteristics when the HPF 11 is viewed from the node N1, and are mainly characteristics of the HPF 11. Thus, they may be simply described as pass characteristics or reflection characteristics of the HPF 11. In the simulation, a line between the antenna terminal T10 and the node N1 is almost neglected, and thus characteristics when the LB transmit/receive system or the HB transmit/receive system is viewed from the antenna terminal T10 are substantially the same as characteristics when the LB transmit/receive system or the HB transmit/receive system is viewed from the node N1.

Figure 5B:
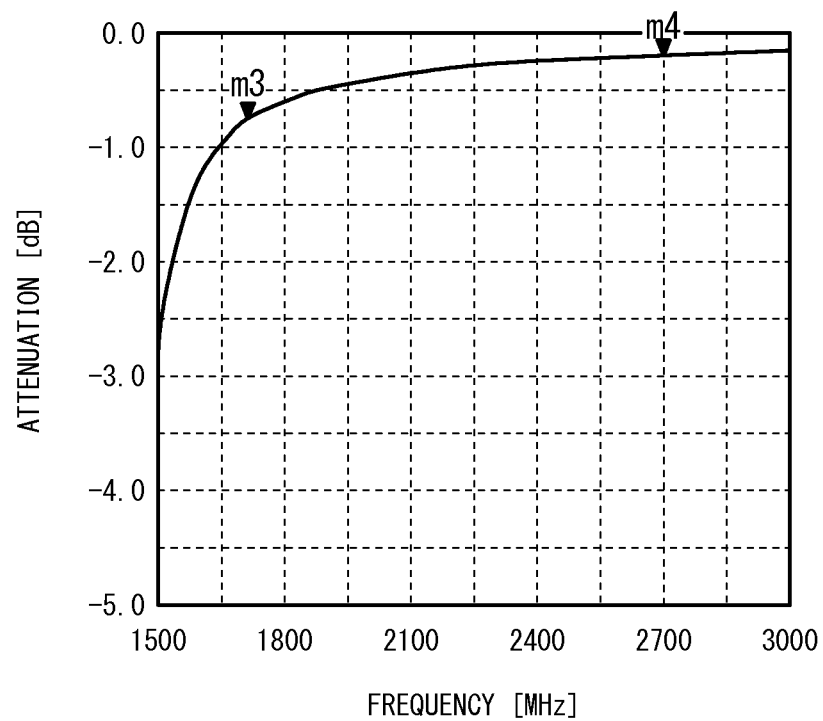
FIG. 5B is a diagram illustrating pass characteristics S31 near the passband of a High Pass Filter (HPF) with the HB transmit/receive system.

FIG. 4B through FIG. 5B illustrate the pass characteristics S31 of the HPF 11 and the pass characteristics S21 of the LPF 12. A typical LB band of a mobile phone is from 699 to 960 MH, and a typical HB band is from 1710 to 2690 MHz In FIG. 4B, a band between markers m1 and m2 is an LB band, and a band between markers m3 and m4 is an HB band. As illustrated in FIG. 4B, the HPF 11 has an attenuation of 25 dB or greater in the LB band. The LPF 12 has an attenuation of 25 dB or greater in the HB band. As illustrated in FIG. 5A, the LPF 12 has an insertion loss of 1 dB or less in the LB band. As illustrated in FIG. 5B, the HPF 11 has an insertion loss of 1 dB or less in the HB band. No notch is observed near the passbands in the LPF 12 and the HPF 11.

As described above, the diplexer 10 alone has good LPF characteristics and good HPF characteristics.

The terminal T20 of the diplexer 10 was grounded to simulate the passband of the LPF 11. This condition assumes that the HB transmit/receive system 28 shorts out at a specific frequency.

Figure 6A:
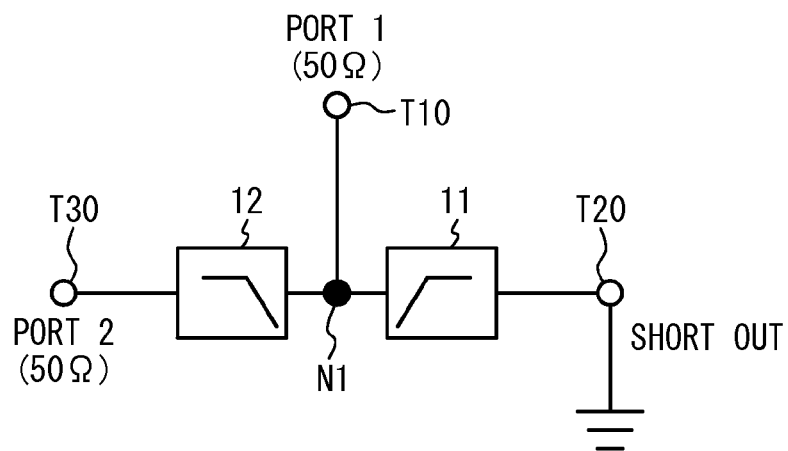
FIG. 6A is a circuit diagram of a diplexer used to simulate pass characteristics of the LPF with the LB transmit/receive system.
Figure 6B:
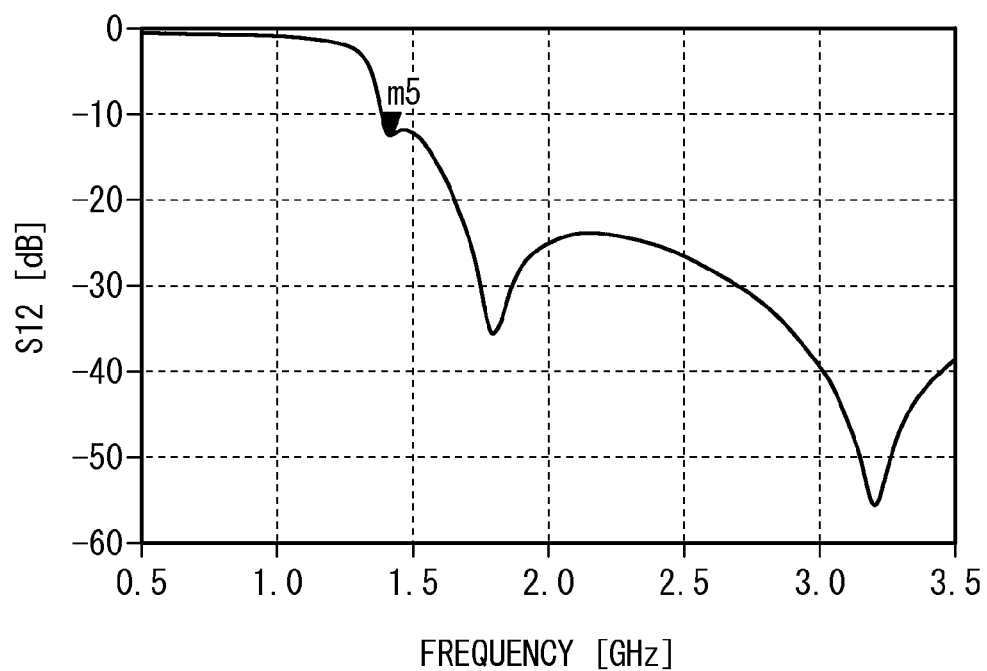
FIG. 6B is a diagram illustrating pass characteristics S12 of the LPF with the LB transmit/receive system.

FIG. 6A is a circuit diagram of a diplexer used to simulate pass characteristics of the LPF with the LB transmit/receive system, and FIG. 6B is a diagram illustrating pass characteristics S12 of the LPF with the LB transmit/receive system. As illustrated in FIG. 6A, the terminal T20 is shorted out to ground. The diplexer has the same configuration as that of FIG. 4A except the above described configuration, and thus a description is omitted. As illustrated in FIG. 6B, a notch is observed at a frequency of 1.42 GHz indicated by marker m5 in pass characteristics S12 of the LPF 12.

Figure 7A:
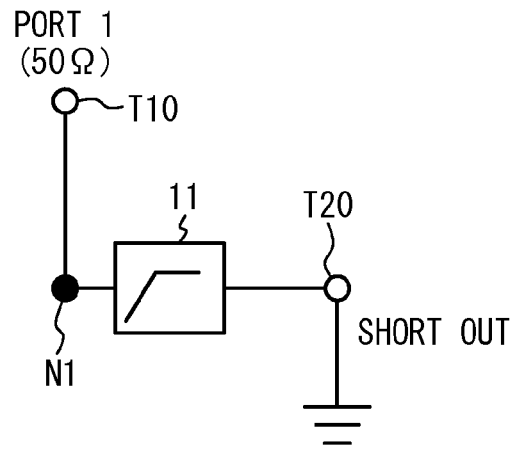
FIG. 7A is a diagram of a circuit used to simulate reflection characteristics of the HPF with the HB transmit/receive system.
Figure 7B:
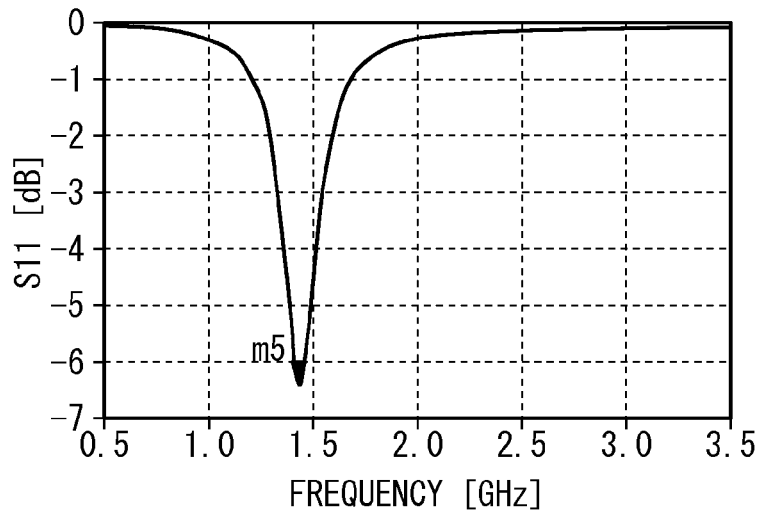
FIG. 7B is a diagram illustrating return loss of reflection characteristics S11.
Figure 7C:
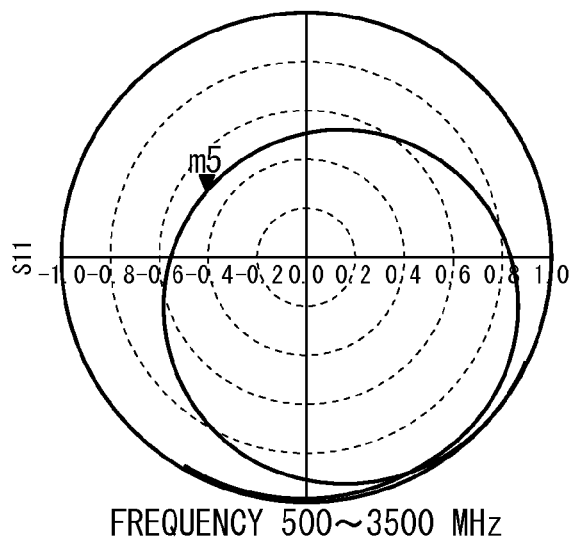
FIG. 7C is a polar chart of the reflection characteristics S11.

FIG. 7A is a diagram of a circuit used to simulate reflection characteristics of the HPF with the HB transmit/receive system. As illustrated in FIG. 7A, the HPF 11 is connected between the node N1 and the terminal T20. The terminal T20 is shorted out to ground. To investigate the cause of a notch, simulated were reflection characteristics S11 when the HPF 11 is viewed from the node N1 as illustrated in FIG. 7A. FIG. 7B is a diagram illustrating return loss of the reflection characteristics S11, and FIG. 7C is a polar chart of the reflection characteristics S11. The frequency is scanned from 500 MHz to 3.5 GHz.

As illustrated in FIG. 7B, at a frequency of 1.42 GHz (m5), the magnitude of the reflection characteristics S11 at an impedance of 50Ω when the HPF 11 is viewed from the node N1 rapidly decreases. The reflection characteristics S11 is −6.2 dB at a frequency of 1.42 GHz. As illustrated in FIG. 7C, the reflection characteristics S11 is close to the reference impedance at a frequency of 1.42 GHz (m5). The magnitude (MAG) of the reflection characteristics S11 is 0.488 and the phase angle (ANG) is 145° at a frequency of 1.42 GHz. As illustrated in FIG. 7C, at a frequency of 1.42 GHz, the reflection characteristics S11 is close to the reference impedance, which means that the magnitude of the reflection coefficient is close to zero.

The terminal T20 of the diplexer 10 was grounded through a line to simulate the passband of the LPF 12 with the LB transmit/receive system. The line is assumed to be a line in the module.

Figure 8A:
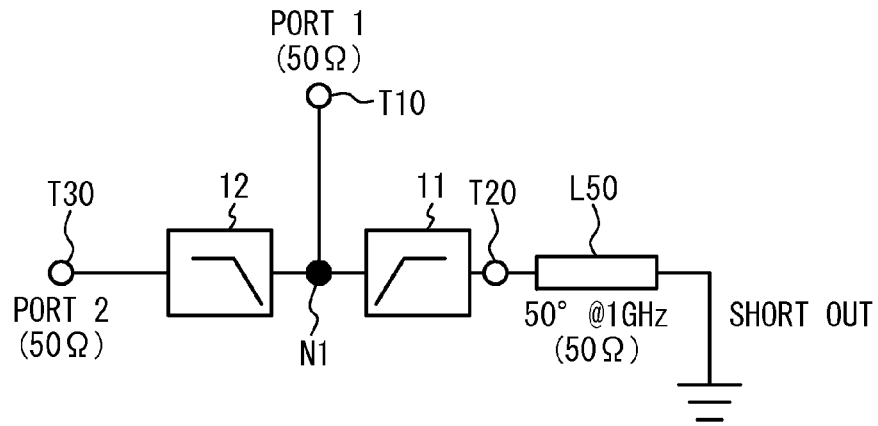
FIG. 8A is a circuit diagram of a diplexer used to simulate pass characteristics of the LPF with the LB transmit/receive system.
Figure 8B:
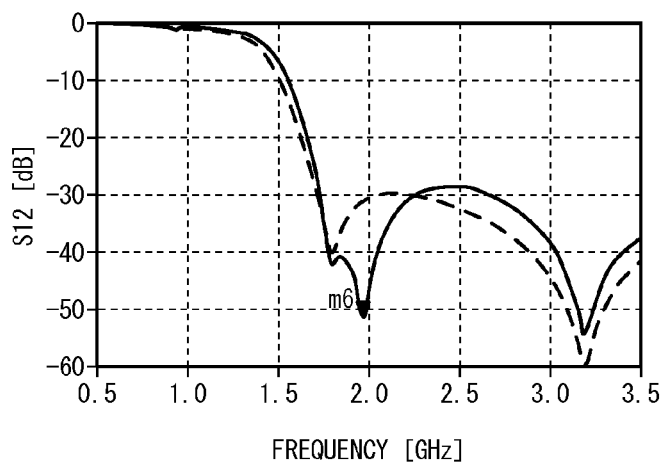
FIG. 8B is a diagram illustrating pass characteristics S12 of the LPF with the LB transmit/receive system.
Figure 8C:
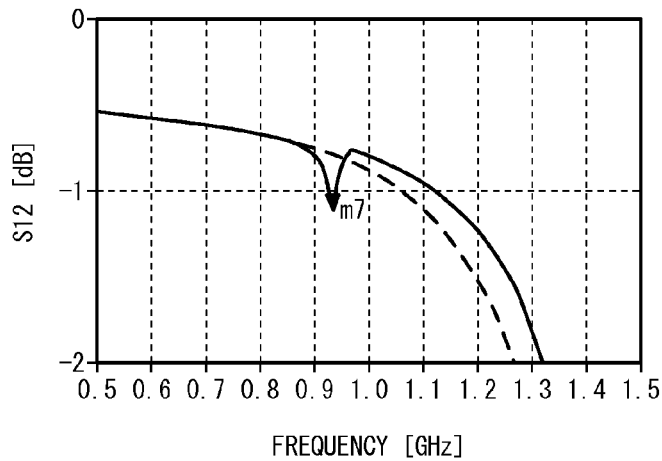
FIG. 8C is an enlarged view of the pass characteristics S12 of the LPF with the LB transmit/receive system.

FIG. 8A is a circuit diagram of a diplexer used to simulate pass characteristics of the LPF with the LB transmit/receive system, FIG. 8B is a diagram illustrating pass characteristics S12 of the LPF with the LB transmit/receive system (LPF), and FIG. 8C is an enlarged view of the pass characteristics S12 of the LPF with the LB transmit/receive system.

As illustrated in FIG. 8A, the terminal T20 is shorted out to ground through a line L50. The line L50 has a characteristic impedance of the reference impedance (50Ω), and has a length corresponding to a phase of 50° at a frequency of 1 GHz. The diplexer has the same configuration as that of FIG. 6A except the above described configuration, and thus a description is omitted.

In FIG. 8B and FIG. 8C, dashed lines exhibit pass characteristics of the diplexer 10 alone (FIG. 4A), and solid lines exhibit pass characteristics of the diplexer in FIG. 8A. As illustrated in FIG. 8B, in the pass characteristics S12 of the LPF 12 with the LB transmit/receive system, a notch is not observed in the diplexer 10 alone. However, a notch is observed at a frequency of 1.975 GHz indicated by marker m6 in FIG. 8B. As illustrated in FIG. 8C, a notch is observed at a frequency of 935 MHz indicated by marker m7.

Figure 9A:
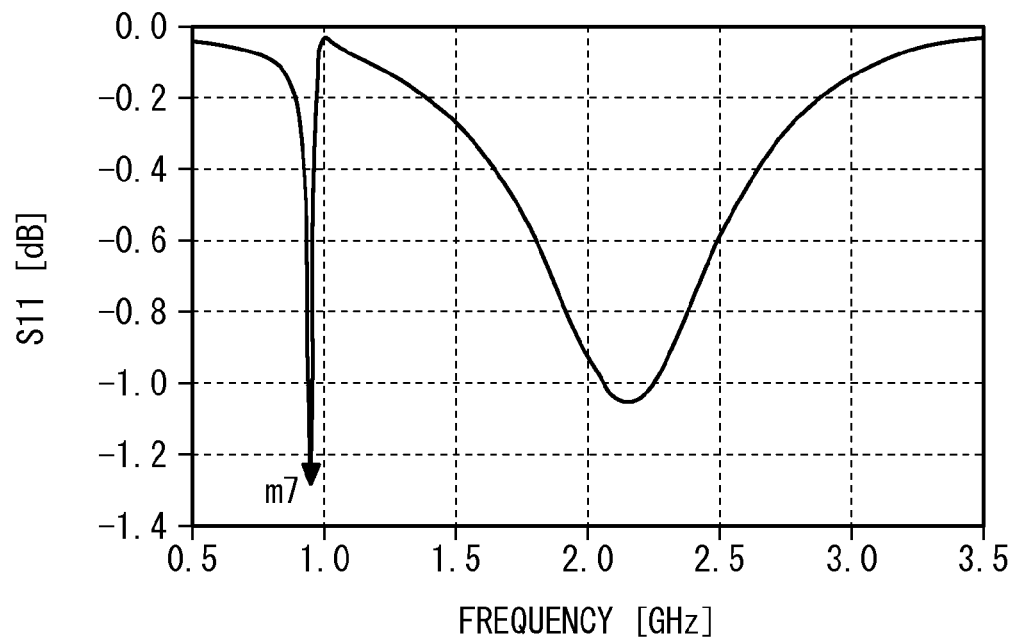
FIG. 9A is a diagram illustrating return loss of reflection characteristics S11.
Figure 9B:
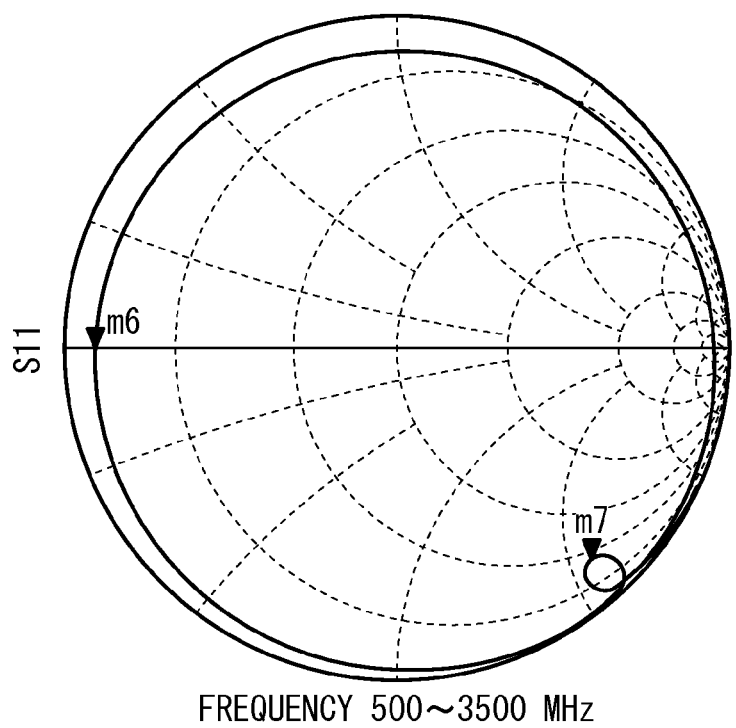
FIG. 9B is a Smith chart of the reflection characteristics S11.

To investigate the cause of the notch, reflection characteristics S11 of the HPF 11 with the HB transmit/receive system viewed from the node N1 were simulated. FIG. 9A is a diagram illustrating return loss of the reflection characteristics S11, and FIG. 9B is a Smith chart of the reflection characteristics S11.

As illustrated in FIG. 9A, at a frequency of 935 MHz (m7), the return loss when the HPF 11 with the HB transmit/receive system is viewed from the node N1 rapidly decreases. No decrease in return loss is observed around a frequency of 1.975 GHz. As illustrated in FIG. 9B, near a frequency of 935 MHz (m7), the reflection characteristics S11 loops, and the reflection characteristics S11 is locally close to the reference impedance at a frequency of 935 MHz (m7). The reflection characteristics S11 have a MAG of 0.861 and an ANG of is −47° at a frequency of 935 MHz.

At a frequency of 1.975 GHz (m6), the reflection characteristics S11 have a MAG of 0.902 and an ANG of −180°. This demonstrates that at a frequency of 1.975 GHz, the reactance component of the impedance when the HFP 11 is viewed from the node N1 is approximately zero, and the magnitude of the impedance is less than that of the reference impedance. Accordingly, when the HPF 11 is viewed from the node N1, the impedance seems almost in a short-out state to ground.

Figure 10A:
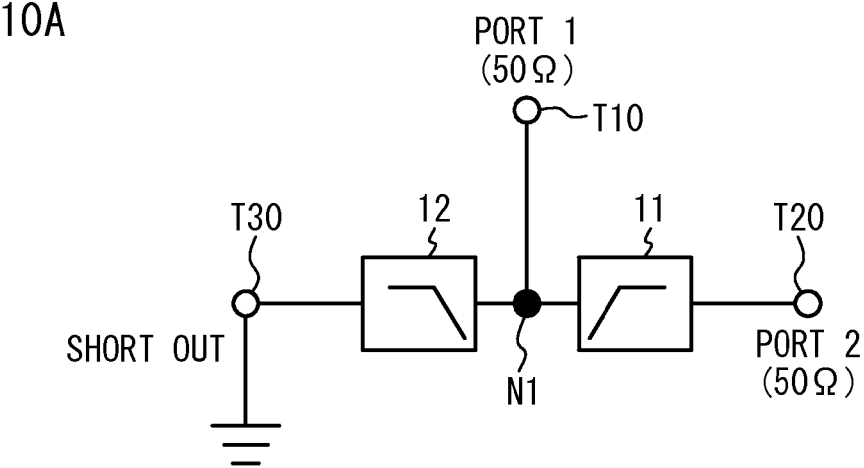
FIG. 10A is a circuit diagram of a diplexer used to simulate pass characteristics of the HPF with the HB transmit/receive system.
Figure 10B:
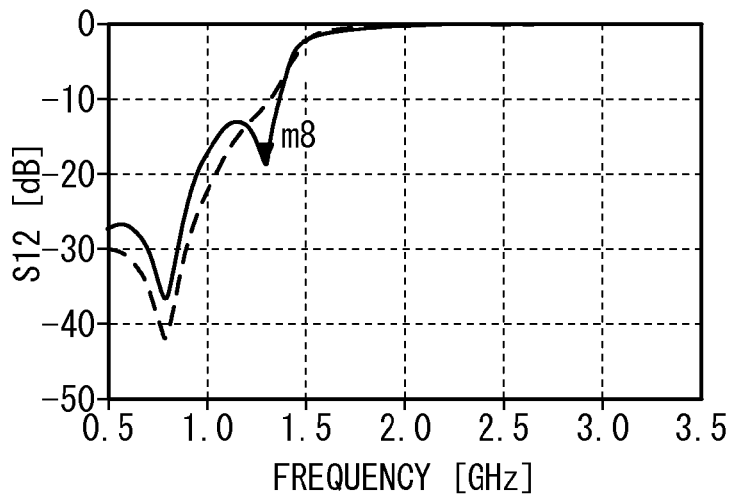
FIG. 10B is a diagram illustrating pass characteristics S12 of the HPF with the HB transmit/receive system.
Figure 10C:
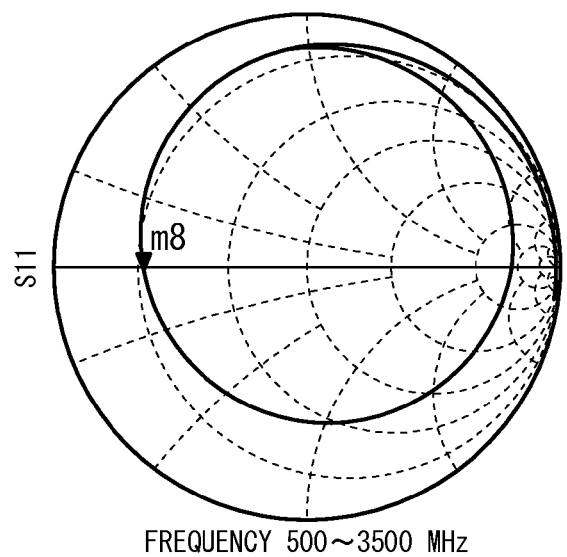
FIG. 10C is a Smith chart of reflection characteristics S11.

The terminal T30 of the diplexer 10 was grounded to simulate the passband of the HPF 11. FIG. 10A is a circuit diagram of a diplexer used to simulate pass characteristics of the HPF with the HB transmit/receive system, FIG. 10B is a diagram illustrating pass characteristics S12 of the HPF with the HB transmit/receive system, and FIG. 10C is a Smith chart of reflection characteristics S11. As illustrated in FIG. 10A, the terminal T20 correspond to a port 2, and is terminated in a reference impedance of 50Ω. The terminal T30 is shorted out to a ground. The diplexer has the same configuration as that of FIG. 4A except the above described configuration, and thus a description is omitted.

In FIG. 10B, the dashed line exhibits pass characteristics of the diplexer 10 alone (FIG. 4A), and the solid line exhibits pass characteristics of the diplexer in FIG. 10A. As illustrated in FIG. 10B, in the pass characteristics S12 of the HPF 11, a notch is observed at a frequency of 1.305 GHz indicated by marker m8. As illustrated in FIG. 10C, at a frequency of 1.305 GHz (m8), the reflection characteristics S11 have a MAG of 0.646 and an ANG of −180°. This demonstrates that at a frequency of 1.305 GHz, the reactance component of the impedance when the LPF 12 is viewed from the node N1 is approximately zero, and the magnitude of the impedance is less than that of the reference impedance. Thus, when the LPF 12 is viewed from the node N1, the impedance seems almost in a short-out state to ground.

The aforementioned simulation results demonstrate that a notch is formed in the pass characteristics S12 of the filter (the HPF 11 or the LPF 12) of the diplexer 10 under the following two conditions.

First condition: reflection characteristics when an opposing filter (the LPF 12 or the HPF 11) is viewed from the node N1 are locally close to the reference impedance (e.g., m5 and m7). When the reflection coefficient when the opposing filter is viewed from the node N1 decreases, the signal transmitted through the filter leaks to the opposing filter. Thus, a notch is formed in the pass characteristics of the filter at a frequency that meets the first condition.

Second condition: an impedance when the opposing filter is viewed from the node N1 is close to a short-out state (e.g., m6 and m8). In other words, the reactance component of the impedance when the opposing filter is viewed from the node N1 is zero, and the impedance is less than the reference impedance. The impedance is preferably less than a half of the reference impedance, and more preferably less than one third of the reference impedance.

Figure 11A:
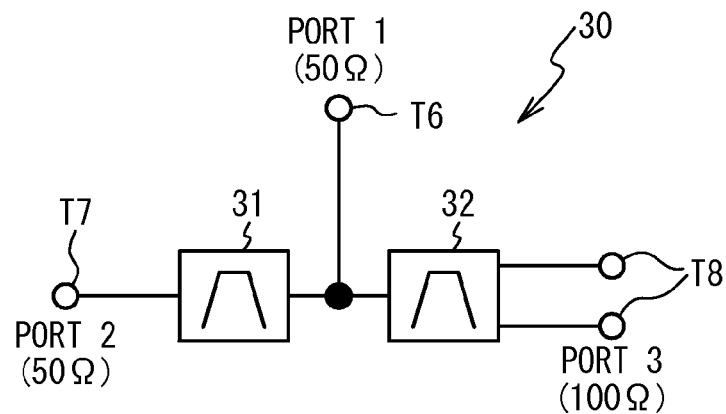
FIG. 11A is a circuit diagram of a measured duplexer.
Figure 11B:
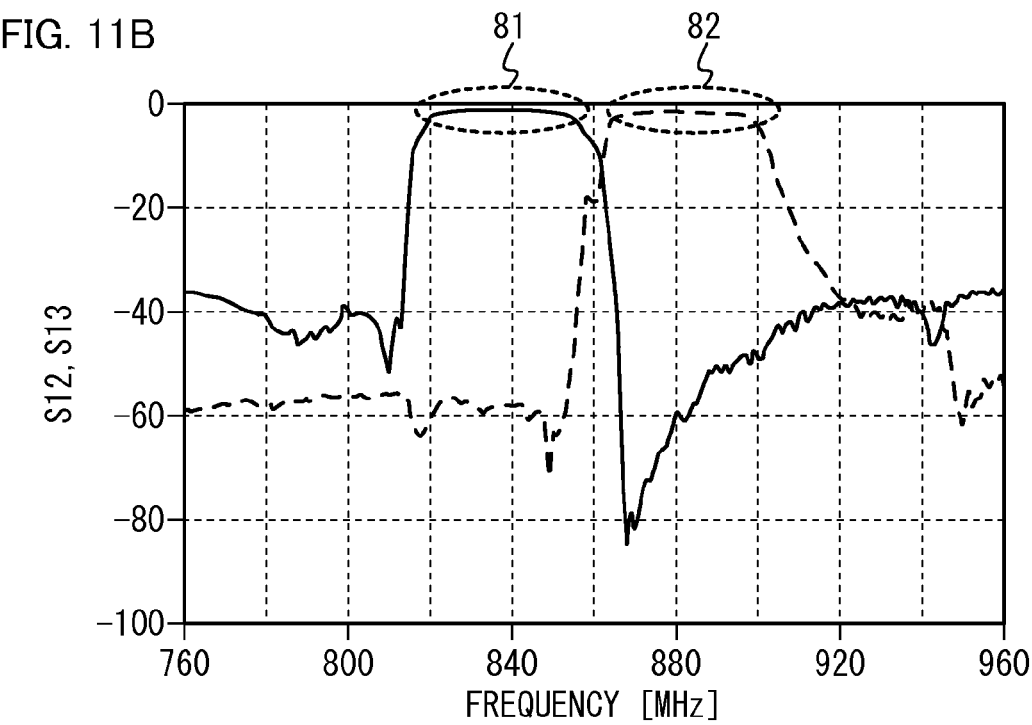
FIG. 11B is a diagram illustrating pass characteristics S21 and S31 of the duplexer.
Figure 12A:
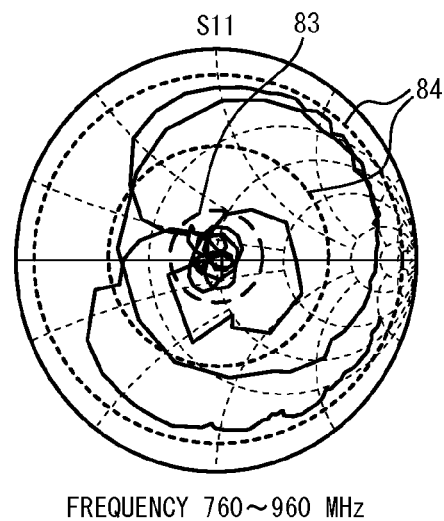
FIG. 12A through FIG. 12C are Smith charts illustrating reflection characteristics S11, S22, and S33, respectively.
Figure 12B:
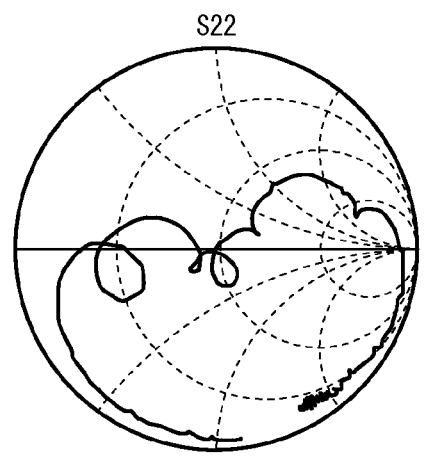
Figure 12C:
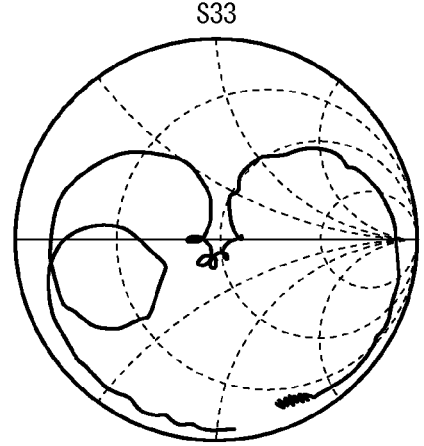

A description will next be given of pass characteristics of a duplexer. FIG. 11A is a circuit diagram of a duplexer used to measure characteristics, FIG. 11B is a diagram illustrating pass characteristics S12 and S13 of the duplexer. FIG. 12A through FIG. 12C are Smith charts illustrating reflection characteristics S11, S22 and S33.

As illustrated in FIG. 11A, a transmit filter 31 is connected between the common terminal T6 and a terminal T7, and a receive filter 32 is connected between the common terminal T6 and terminals T8. The receive filter 32 is a balanced output filter, and the terminals T8 are balanced terminals. The terminals T8 may be unbalanced terminals. The common terminals T6 through T8 correspond to ports 1 through 3, respectively. The common terminal T6 and the terminal T7 are terminated in a reference impedance of 50Ω. The balanced terminals T8 are terminated in an impedance of 100 Ω.

In FIG. 11B, the solid line exhibits pass characteristics S12 of the transmit filter 21, and the dashed line exhibits pass characteristics S13 of the receive filter 22. Dotted line ellipses exhibit a transmit band 81 and a receive band 82. In the transmit filter 31, the transmit band 81 is a passband, and the receive band 82 is a suppression band. In the receive filter 32, the receive band 82 is a passband, and the transmit band 81 is a suppression band. The passband of the transmit filter 31 and the passband of the receive filter 32 form the communication band of the duplexer 30.

As illustrated in FIG. 12A, the reflection characteristics S11 when the transmit filter 31 and the receive filter 32 are viewed from the common terminal T6 (port 1) are a region 83 close to 50Ω in the transmit band and the receive band. The reflection characteristics S11 are a suppression region 84 in other frequency bands. As illustrated in FIG. 12B, the reflection characteristics S22 when the transmit filter 31 is viewed from the terminal T7 (port 2) are close to 50Ω in the transmit band, and are a suppression region in other frequency bands. As illustrated in FIG. 12C, the reflection characteristics S33 when the receive filter 32 is viewed from the terminal T7 (port 8) are close to 50Ω in the transmit band, and are a suppression region in other frequency bands.

Figure 13:
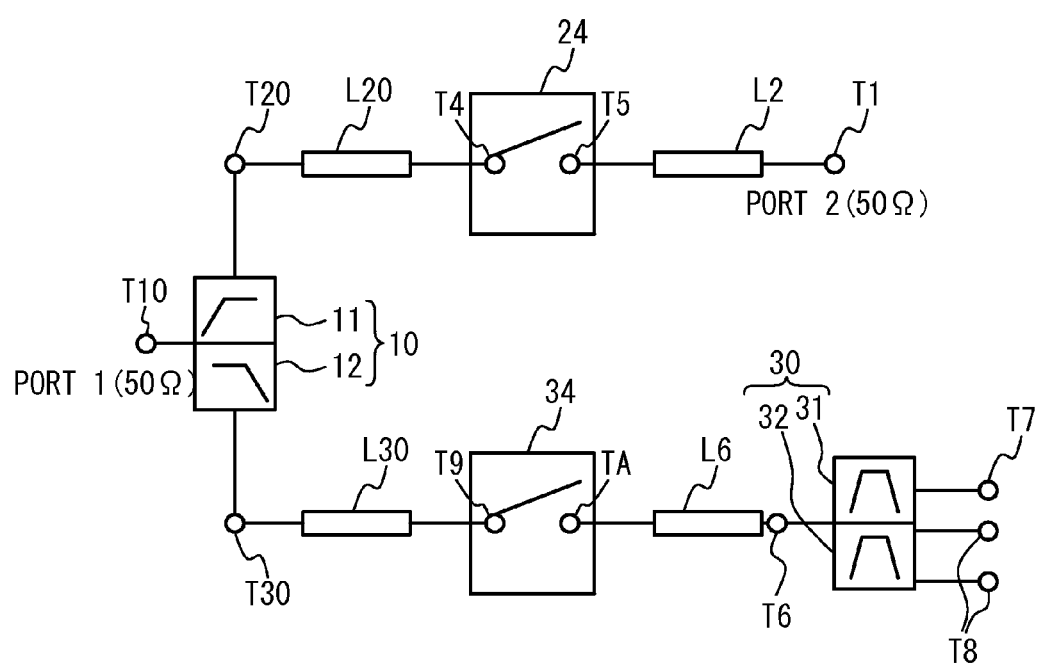
FIG. 13 is a circuit diagram of a circuit used to simulate pass characteristics of the HPF with the HB transmit/receive system.

A simulation was performed on a circuit combining the diplexer 10 illustrated in FIG. 4A and the duplexer 30 illustrated in FIG. 11A. FIG. 13 is a circuit diagram of a circuit used to simulate pass characteristics of the HPF with the HB transmit/receive system. As illustrated in FIG. 13, the terminal T20 of the diplexer 10 is coupled to the terminal T1 through the switch 24. A line L20 is connected between the terminal T20 of the diplexer 10 and the terminal T4 of the switch 24. The line L2 is connected between the terminal T5 of the switch 24 and the terminal T1. The terminal T30 of the diplexer 10 is coupled to the common terminal T6 of the duplexer 30 through the switch 34. The duplexer 30 is coupled to the terminals T7 and T8. In the diplexer 10, the transmit filter 31 is connected between the terminals T6 and T7, and the receive filter 32 is connected between the terminals T6 and T8. The terminals T8 are balanced terminals. A line L30 is connected between the terminal T30 and a terminal T9 of the switch 34. The line L6 is connected between a terminal TA of the switch 34 and the terminal T6.

The antenna terminal T10 and the terminal T1 correspond to ports 1 and 2, respectively. The antenna terminal T10 and the terminal T1 are terminated in a reference impedance of 50Ω. The duplexer 30 included in the LB transmit/receive system exemplifies a duplexer for Band 5. The terminal T1 is terminated in an impedance of 50Ω assuming the passband of the duplexer coupled to the HB transmit/receive system. The line L20 has an electrical length of 5.0 mm at a frequency of 2 GHz and the line L2 has an electrical length of 8.2 mm at a frequency of 2 GHz. The line L30 has an electrical length of 5.8 mm at a frequency of 1 GHz, and the line L6 has an electrical length of 8.33 mm at a frequency of 1 GHz. The electrical length of the line L6 corresponds to a phase of 10°.

Figure 14A:
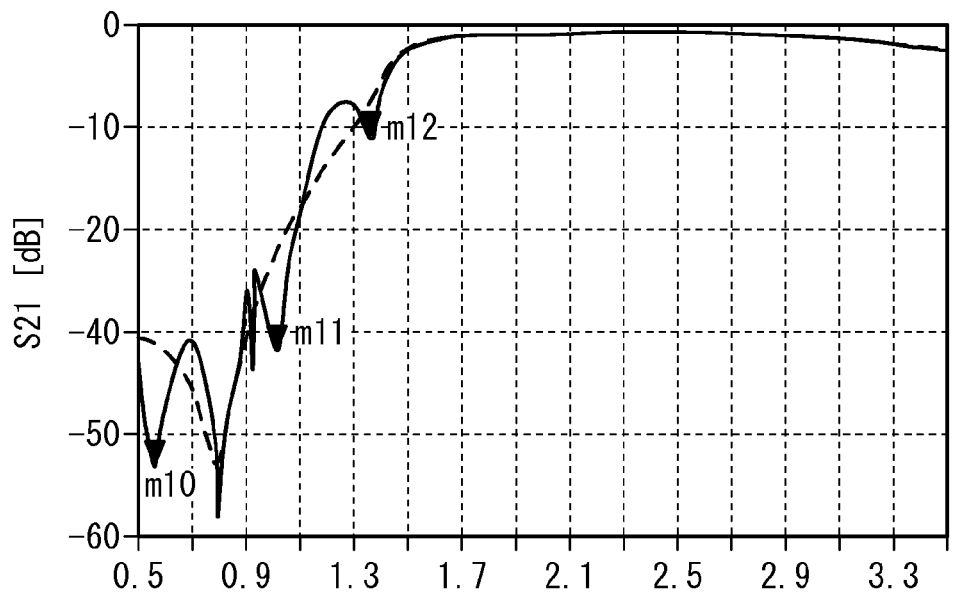
FIG. 14A is a diagram illustrating simulated pass characteristics S21 of the HPF with the HB transmit/receive system.
Figure 14B:
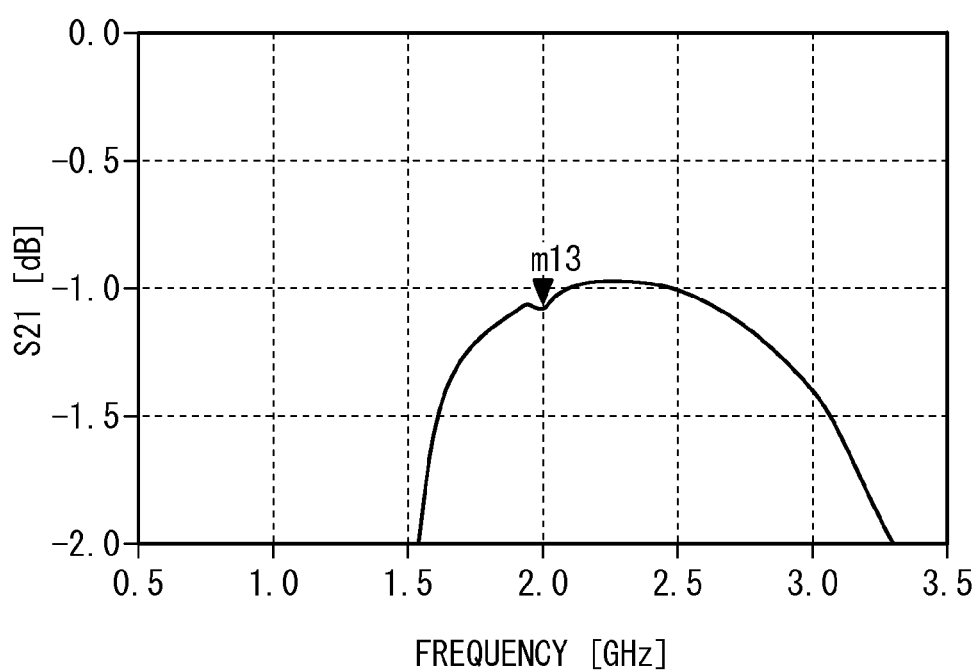
FIG. 14B is an enlarged view of the pass characteristics S21.

FIG. 14A is a diagram illustrating simulated pass characteristics S21 of the HPF with the HB transmit/receive system, and FIG. 14B is an enlarged view of the pass characteristics S21. In FIG. 14A, the solid line exhibits the pass characteristics S21 from the terminal T10 to the terminal T1 in the circuit illustrated in FIG. 13. The dashed line exhibits pass characteristics of the HPF 11 when the terminal T30 of the LPF 12 is terminated in an impedance of 50Ω in FIG. 13. As illustrated in FIG. 14A, when the terminal T30 is terminated in an impedance of 50Ω, no notch is observed in the pass characteristics S21. When the duplexer 30 is coupled to the terminal T30, notches are observed at frequencies of 575 MHz indicated by marker m10, 1.025 GHz indicated by marker m11, and 1.375 GHz indicated by marker m12. As illustrated in FIG. 14B, a notch is observed at a frequency of 2.000 GHz indicated by marker m13.

Figure 15A:
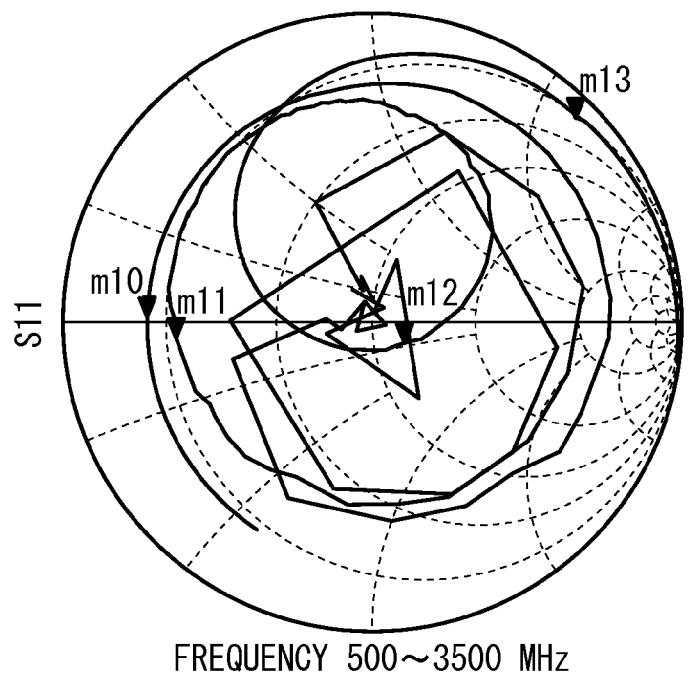
FIG. 15A is a Smith chart of reflection characteristics S11.
Figure 15B:
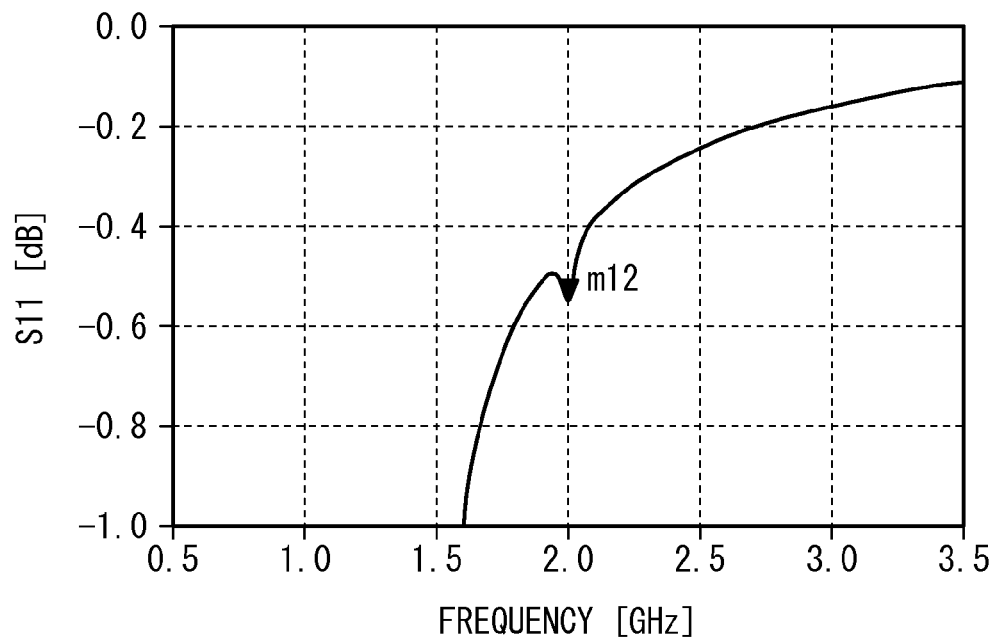
FIG. 15B is a diagram illustrating return loss of the reflection characteristics S11.

FIG. 15A is a Smith chart of reflection characteristics S11, and FIG. 15B is a diagram illustrating return loss of the reflection characteristics S11. The reflection characteristics S11 is reflection characteristics when the duplexer 30 is viewed from the antenna terminal T10. As illustrated in FIG. 15A, at a frequency of 575 MHz (m10), the reflection characteristics S11 have a MAG of 0.757 and an ANG of −178°. At a frequency of 1.025 GHz (m11), the reflection characteristics S11 have a MAG of 0.659 and an ANG of −176°. Markers m10 and m11 correspond to the aforementioned second condition.

At a frequency of 1.335 GHz (m12), the reflection characteristics S11 have a MAG of 0.110 and an ANG of −36°. As described above, the reflection characteristics S11 are close to the reference impedance. Marker m12 corresponds to the aforementioned first condition. At a frequency of 2.000 GHz (m13), the reflection characteristics S11 have a MAG of 0.939 and an ANG of 46°. The reflection characteristics S11 slightly decrease near m13, and are locally close to the reference impedance.

As illustrated in FIG. 15B, at a frequency of 2.000 GHz (m13), the reflection characteristics S11 is locally small. Accordingly, m13 corresponds to the aforementioned first condition.

As described above, even when the duplexer 30 is coupled to the diplexer 10, the first and second conditions are the conditions under which a notch is formed in pass characteristics.

Figure 16:
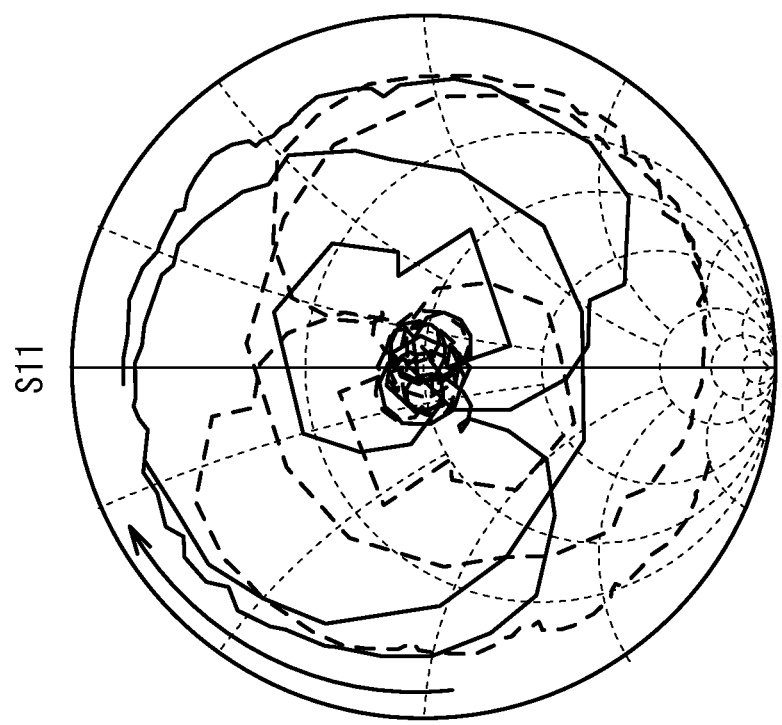
FIG. 16 is a Smith chart illustrating the reflection characteristics S11 of the duplexer.

FIG. 16 is a Smith chart illustrating reflection characteristics S11 of the duplexer. The solid line exhibits the reflection characteristics S11 when the duplexer 30 is viewed from the terminal T30 in FIG. 13. The dashed line exhibits reflection characteristics S11 of the duplexer 30 alone in FIG. 11A, and have the same characteristics as those of FIG. 12A. In the circuit of FIG. 13, the line L30, the switch 34, and the line L6 are connected between the terminal T30 and the duplexer 30. This results in the rotation of the solid line by the phase corresponding to the total electrical length of the line L30, the switch 34 and the line L6 with respect to the dashed line as indicated by the arrow.

Figure 17A:
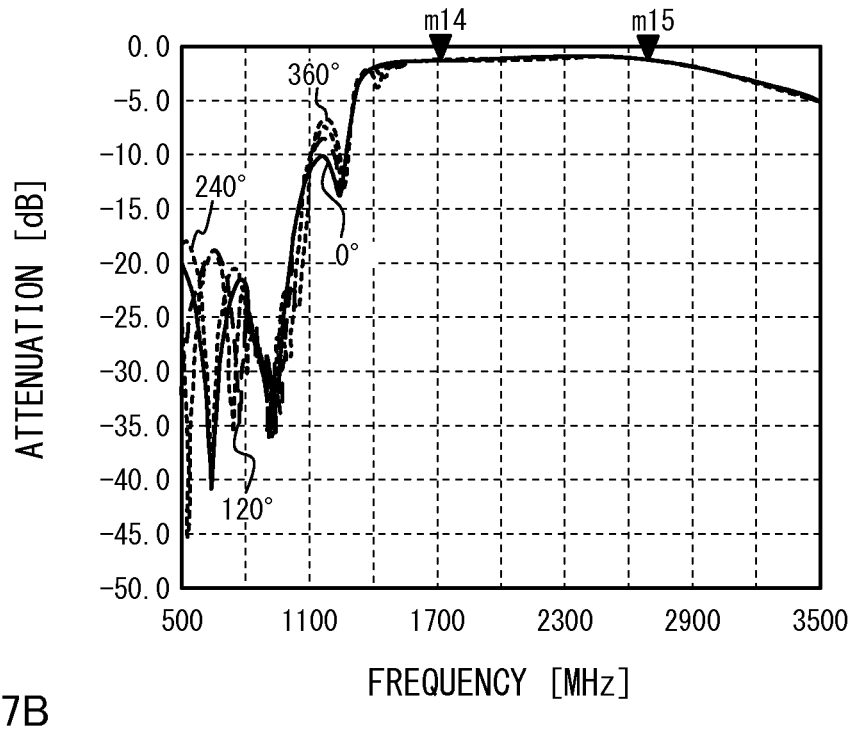
FIG. 17A is a diagram illustrating pass characteristics S21.
Figure 17B:
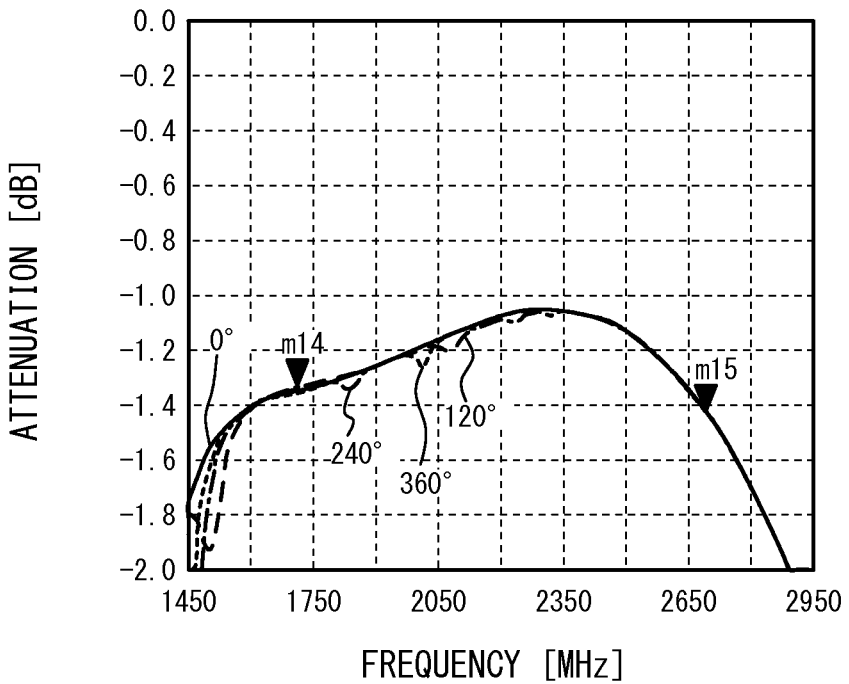
FIG. 17B is an enlarged view of FIG. 17A.

Pass characteristics S21 were simulated by changing the electrical length of the line L6 in FIG. 13 so as to correspond to phases of 0°, 120°, 240°, and 360° at a frequency of 1 GHz. FIG. 17A is a diagram illustrating pass characteristics S21, and FIG. 17B is an enlarged view of FIG. 17A. A band between markers m14 and m15 is an HB band. As illustrated in FIG. 17A and FIG. 17B, the position of a notch changes according to the change of the electrical length of the line L6. A notch is formed in the HB band when the line L6 has a certain electrical length.

Figure 18A:
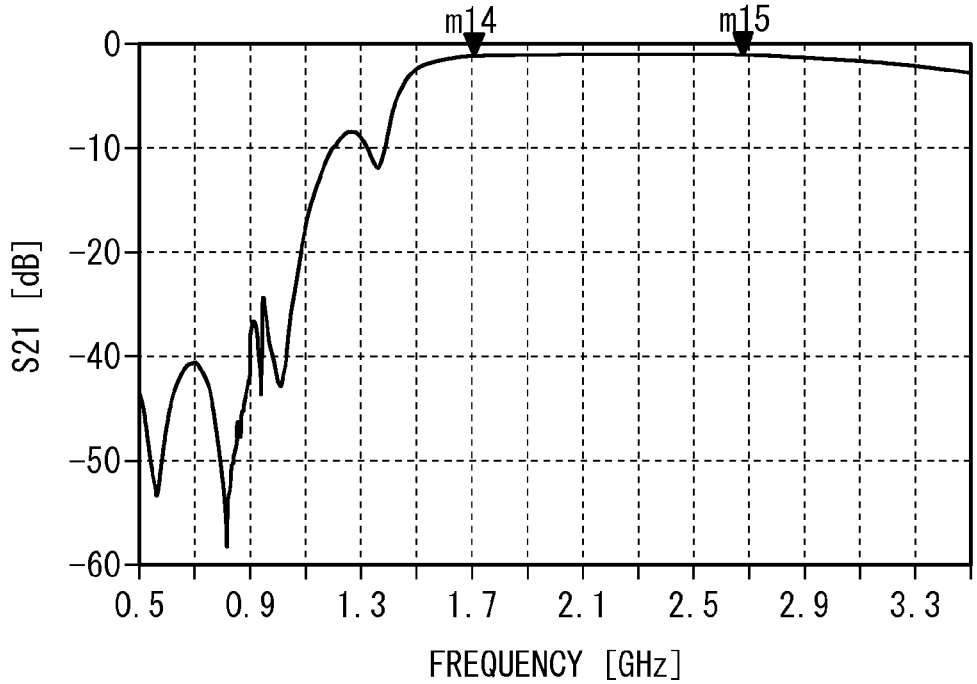
FIG. 18A is a diagram illustrating pass characteristics S21.
Figure 18B:
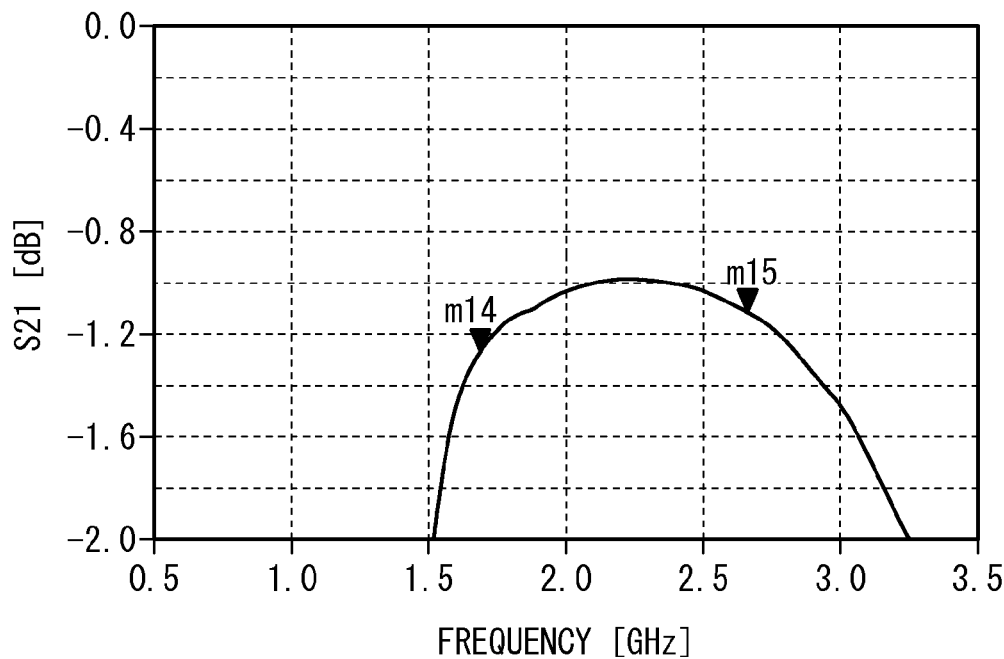
FIG. 18B is an enlarged view of FIG. 18A.

Thus, to form no notch in the HB band, the electrical length of the line L6 in FIG. 13 is set to be 8.33 mm at a frequency of 1 GHz. FIG. 18A is a diagram illustrating pass characteristics S21, and FIG. 18B is an enlarged view of FIG. 18A. No notch is formed between markers m14 and m15 that indicate the HB band.

Figure 19:
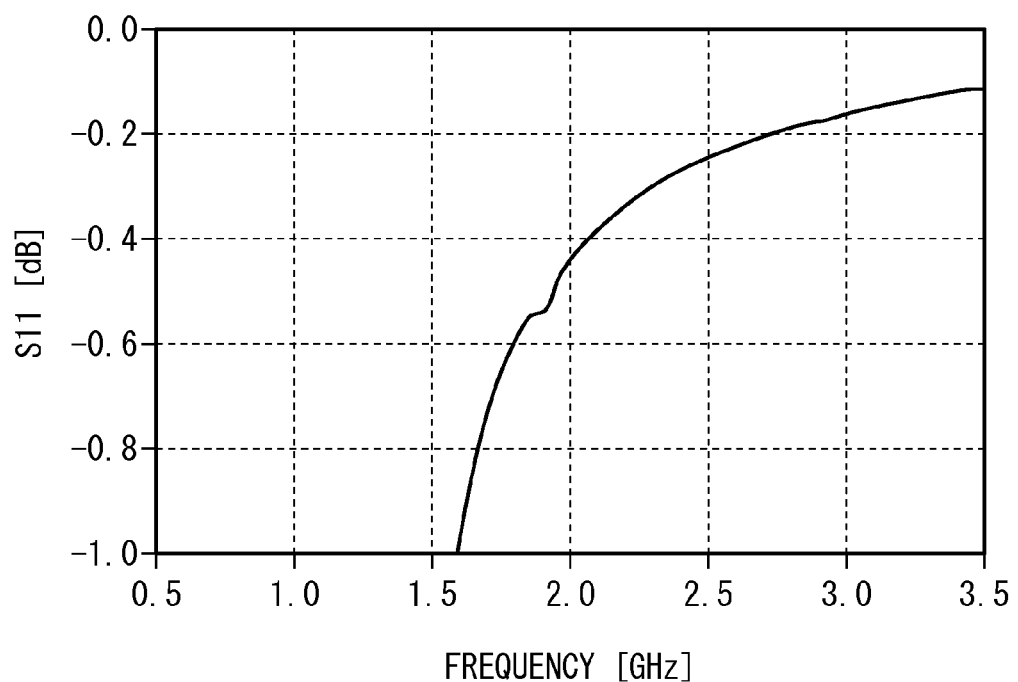
FIG. 19 is a diagram illustrating reflection characteristics S11.

FIG. 19 is a diagram illustrating reflection characteristics S11. As illustrated in FIG. 19, no rapid change is observed in the HB band in the reflection characteristics S11 when the duplexer 30 is viewed from the terminal T10. As described above, the electrical length of the line L6 is adjusted so that the reflection coefficient and the reflection characteristics S11 when the duplexer 30 with the LB transmit/receive system is viewed from the terminal T10 meet the first and second conditions. This enables to prevent the formation of a notch in the HB band in the pass characteristics S21 of the HPF 11. The electrical length can be adjusted in at least one of the lines L6 and L30.

Figure 20:
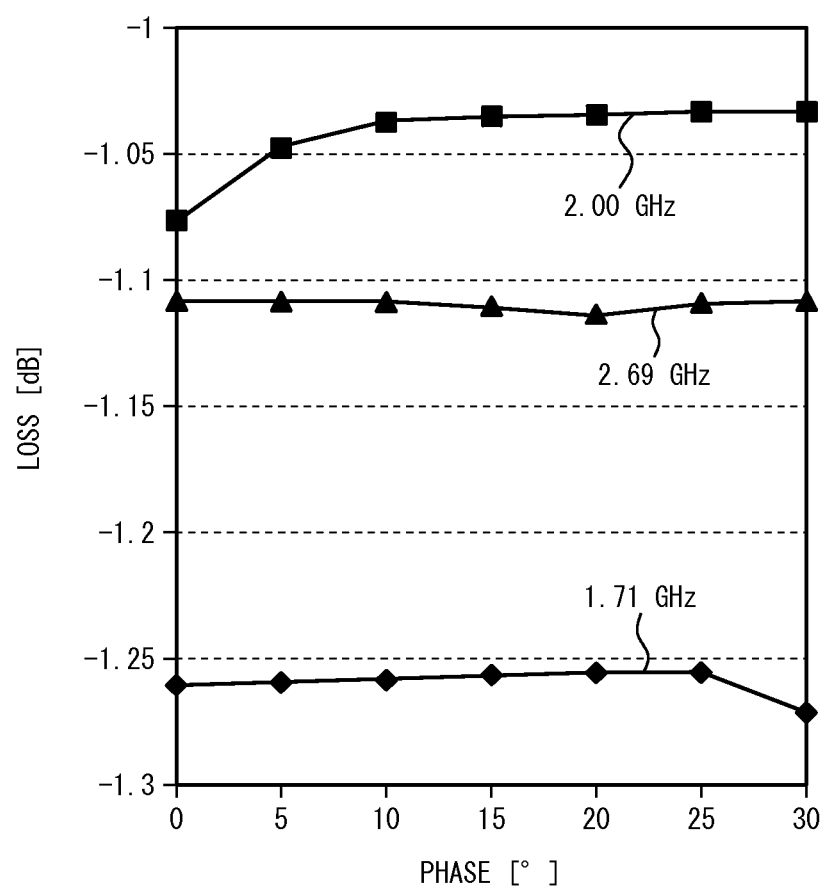
FIG. 20 is a phase versus loss graph.

The electrical length of the line L6 in FIG. 13 was changed so that the phase is from 0° to 30° at a frequency of 1 GHz to calculate pass characteristics at frequencies of 1.71 GHz, 2.00 GHz, and 2.69 GHz. FIG. 20 is a phase versus loss graph. At a phase of between 0° and 25°, the loss of the whole of the HB band is small. This demonstrates that the loss of the HB band can be reduced by appropriately setting the electrical length of the line L6.

In the first embodiment, the diplexer 10 includes the antenna terminal T10, the terminal T20 (first terminal), and the terminal T30 (second terminal) as illustrated in FIG. 1. The common terminals T1a through T1c of the duplexers 20a through 20c are coupled to the terminal T20. The duplexers 30a and 30b have frequency bands different from those of the duplexers 20a through 20c, and the common terminals T6a and T6b are coupled to the terminal T30.

Under such a configuration, the electrical lengths of the lines L30, L6a, and L6b are set so that a frequency F1, at which the reflection coefficient when the duplexers 30a and 30b are viewed from a node at which the antenna terminal T10 is divided into the terminal T20 and the terminal T30 has a minimum value, is not located in any of the passbands of the duplexers 20a through 20c. This enables to prevent a notch due to the first condition from being formed in the passbands of the duplexers 20a through 20c.

In the diplexer 10, the electrical lengths of the lines L30, L6a, and L6b are set so that a frequency F2, at which the reactance component of the impedance when the duplexers 30a and 30b are viewed from a node at which the antenna terminal T10 is divided into the terminal T20 and the terminal T30 is approximately zero and the impedance is less than the reference impedance, is not located in the passbands of the duplexers 20a through 20c. This enables to prevent a notch due to the second condition from being formed in the passbands of the duplexers 20a through 20c.

At least one of the frequencies F1 and F2 is required not to be located in the passbands of the duplexers 20a through 20c.

One or more of the duplexers 20a through 20c may be coupled to the terminal T20. When more than one of the duplexers 20a through 20c are coupled to the terminal T20, it is preferable to provide the switch 24 that connects one of the common terminals T1a through T1c of the duplexers 20a through 20c to the terminal T20.

At least one of the frequencies F1 and F2 is required not to be located in at least one of the passbands of the duplexers 20a through 20c. At least one of the frequencies F1 and F2 is preferably not located in any of the passbands of the duplexers 20a through 20c.

In addition, the electrical lengths of the lines L20 and L1a through L1c are set so that a frequency F3, at which the reflection coefficient when the duplexers 20a through 20c are viewed from a node at which the antenna terminal T10 is divided into the terminal T20 and the terminal T30 in the diplexer 10 has a minimum value, is not located in the passbands of the duplexers 30a and 30b. This enables to prevent a notch due to the first condition from being formed in the passbands of the duplexers 30a and 30b.

The electrical lengths of the lines L20 and L1a through L1c are set so that a frequency F4, at which the reactance component of the impedance when the duplexers 20a through 20c are viewed from a node at which the antenna terminal T10 is divided into the terminal T20 and the terminal T30 in the diplexer 10 is approximately zero and the impedance is less than the reference impedance, is not located in the passbands of the duplexers 30a and 30b. This enables to prevent a notch due to the second condition from being formed in the passbands of the duplexers 30a and 30b.

At least one of the frequencies F3 and F4 is required not to be located in the passbands of the duplexers 30a and 30b.

One or more of the duplexers 30a and 30b may be coupled to the terminal T30. When more than one of the duplexers 30a and 30b are coupled to the terminal T30, it is preferable to provide the switch 34 that connects one of the common terminals T6a and T6b of the duplexers 30a and 30b to the terminal T30.

At least one of the frequencies F3 and F4 is required not to be located in at least one of the passbands of the duplexers 30a and 30b. At least one of the frequencies F3 and F4 is preferably not located in any of the passbands of the duplexers 30a and 30b.

A frequency at which the reflection coefficient when the duplexers 30a and 30b are viewed from a node at which the antenna terminal T10 is divided into the terminal T20 and the terminal T30 in the diplexer 10 has a minimum value in the passband (the HB band) of the diplexer 10 between the node N1 and the terminal coupled to the duplexers 20a through 20c is preferably not located in the passbands of the duplexers 20a through 20c.

A frequency at which the reflection coefficient when the duplexers 20a through 20c are viewed from a node at which the antenna terminal T10 is divided into the terminal T20 and the terminal T30 has a minimum value in the passband (the LB band) of the transmit/receive system including the duplexers 30a and 20b of the diplexer 10 is preferably not located in the passbands of the duplexers 30a and 30b.

Higher frequency signal has greater loss due to a line. Thus, the lines L20 and L1a through L1c between the terminal T20 and the common terminals T1a through T1c of the duplexers 20a through 20c are configured to have less lengths than the lines L30, L6a, and L6b between the terminal T30 and the common terminals T6a and T6b of the duplexers 30a and 30b. This enables to reduce the loss due to the lines L20 and L1a through L1c.

Figure 21:
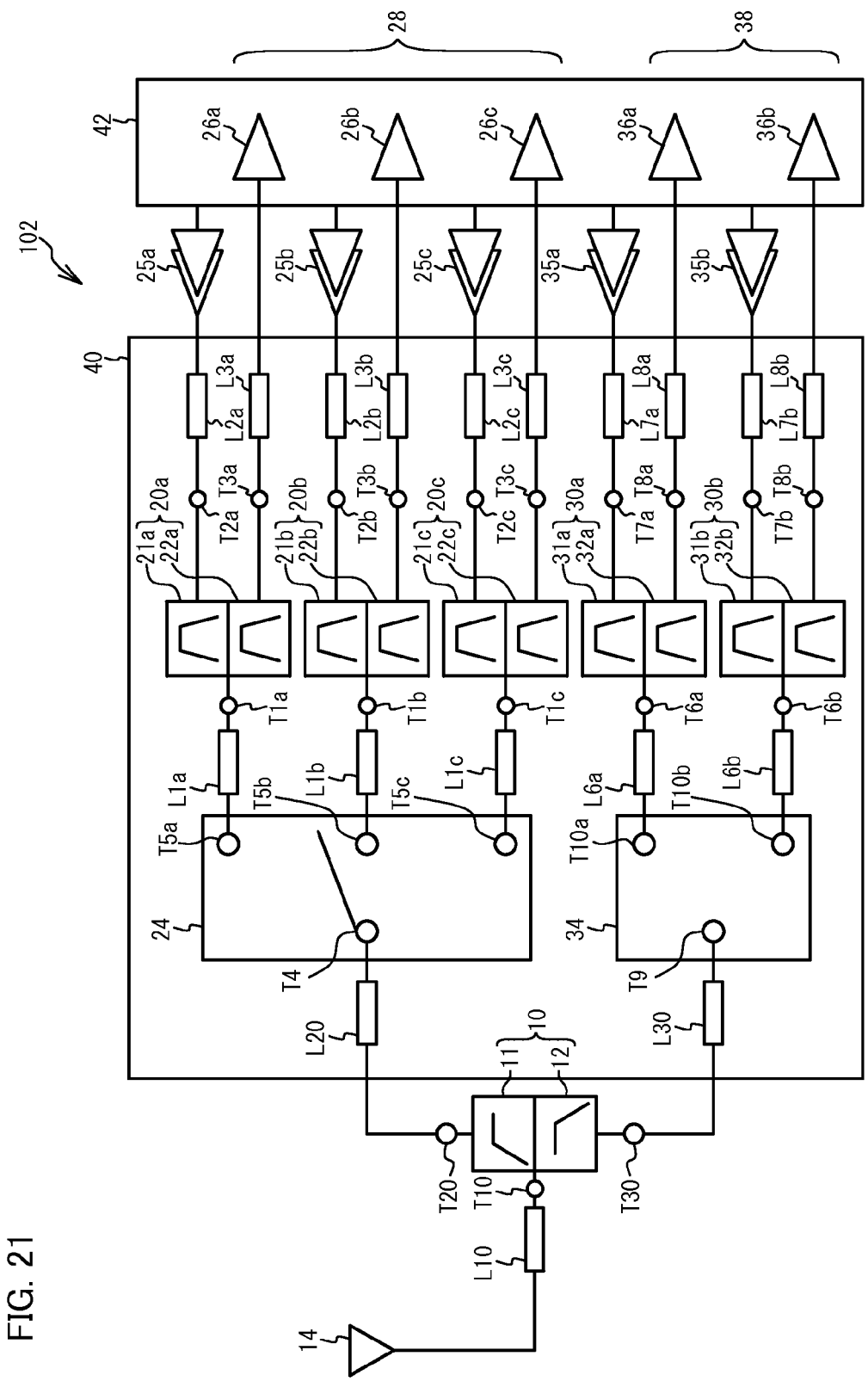
FIG. 21 is a block diagram of a system including a module of a variation of the first embodiment.

FIG. 21 is a block diagram of a system including a module in accordance with a variation of the first embodiment. As illustrated in FIG. 21, in a system 102, the module 40 does not include the diplexer 10. Other configurations are the same as the first embodiment, and thus a description is omitted. The module 40 may include the diplexer 10, or may not include the diplexer 10. Even when the module does not include the diplexer 10, the formation of a notch in the passband is prevented by appropriately setting the electrical length of a line.

Although the embodiments of the present invention have been described in detail, it is to be understood that the various change, substitutions, and alterations could be made hereto without departing from the spirit and scope of the invention.

What is claimed is:

1. A module comprising:
a first duplexer including a common terminal coupled to a first terminal of a diplexer, the diplexer including an antenna terminal coupled to an antenna, the first terminal, and a second terminal; and
a second duplexer including a common terminal coupled to the second terminal of the diplexer and having a passband different from a passband of the first duplexer,
wherein a frequency at which a reactance component of an impedance is approximately zero and the impedance is less than a reference impedance is not located in the passband of the first duplexer, the impedance being an impedance when the second duplexer is viewed from a node at which the antenna terminal is divided into the first terminal and the second terminal in the diplexer.

2. The module according to claim 1, wherein a frequency at which the reactance component of the impedance is approximately zero and the impedance is less than a half of the reference impedance is not located in the passband of the first duplexer.

3. The module according to claim 1, wherein
a frequency at which a reflection coefficient when the second duplexer is viewed from the node has a minimum value is not located in the passband of the first duplexer.

4. The module according to claim 1, wherein
a signal passing through the first duplexer and a signal passing through the second duplexer simultaneously pass through the diplexer.

5. The module according to claim 1, wherein
a frequency of the passband of the first duplexer is greater than a frequency of the passband of the second duplexer, and
a line between the first terminal and the common terminal of the first duplexer is shorter than a line between the second terminal and the common terminal of the second duplexer.

6. The module according to claim 1, wherein
at least one of a frequency at which a reflection coefficient when the first duplexer is viewed from the node has a minimum value and a frequency at which a reactance component of a reflection characteristic when the first duplexer is viewed from the node is approximately zero and the reflection characteristic is less than the reference impedance is not located in the passband of the second duplexer.

7. The module according to claim 1, wherein
the frequency is not located in the passband of the first duplexer when a signal passing through the first duplexer and a signal passing through the second duplexer simultaneously pass through the diplexer.

8. A module comprising:
a first duplexer including a common terminal coupled to a first terminal of a diplexer, the diplexer including an antenna terminal coupled to an antenna, the first terminal, and a second terminal; and
a second duplexer including a common terminal coupled to the second terminal of the diplexer and having a passband different from a passband of the first duplexer,
wherein a frequency at which a reflection coefficient has a minimum value is not located in the passband of the first duplexer, the reflection coefficient being a reflection coefficient when the second duplexer is viewed from a node at which the antenna terminal is divided into the first terminal and the second terminal in the diplexer.

9. The module according to claim 8, wherein a frequency at which the reflection coefficient has a minimum value in a passband of the diplexer between the node and the first terminal is not located in the passband of the first duplexer.

10. The module according to claim 8, wherein
a signal passing through the first duplexer and a signal passing through the second duplexer simultaneously pass through the diplexer.

11. The module according to claim 8, the module further comprising:
a first switch connecting one of common terminals of a plurality of the first duplexers to the first terminal; and
a second switch connecting one of common terminals of a plurality of the second duplexers to the second terminal.

12. The module according to claim 1, the module further comprising:
a first switch connecting one of common terminals of a plurality of the first duplexers to the first terminal; and
a second switch connecting one of common terminals of a plurality of the second duplexers to the second terminal.

13. The module according to claim 8, wherein
a frequency of the passband of the first duplexer is greater than a frequency of the passband of the second duplexer, and
a line between the first terminal and the common terminal of the first duplexer is shorter than a line between the second terminal and the common terminal of the second duplexer.

14. The module according to claim 8, wherein
at least one of a frequency at which a reflection coefficient is minimum when the first duplexer is viewed from the node and a frequency at which a reactance component of reflection characteristics when the first duplexer is viewed from the node is almost zero and reflection characteristics is less than the reference impedance is not located in the passband of the second duplexer.

15. The module according to claim 8, wherein
the frequency is not located in the passband of the first duplexer when a signal passing through the first duplexer and a signal passing through the second duplexer simultaneously pass through the diplexer.

* * * * *